United States Patent [19]

Nagamune et al.

[11] Patent Number: 5,148,177
[45] Date of Patent: Sep. 15, 1992

[54] IN-FURNACE LEVEL METER AND ANTENNA THEREFORE

[75] Inventors: Akio Nagamune; Kouichi Tezuka; Yoshiyuki Kanao; Isamu Komine, all of Tokyo, Japan

[73] Assignee: NKK Corporation, Tokyo, Japan

[21] Appl. No.: 660,299

[22] Filed: Feb. 22, 1991

[30] Foreign Application Priority Data

Feb. 26, 1990 [JP] Japan ................................ 2-42444
Apr. 24, 1990 [JP] Japan ............................... 2-106481

[51] Int. Cl.⁵ .............................................. G01F 23/00
[52] U.S. Cl. ................................... 342/124; 343/907
[58] Field of Search ....................... 343/786, 840, 907; 342/124

[56] References Cited

U.S. PATENT DOCUMENTS

| 3,701,518 | 10/1972 | Herff | 74/59 X |
| 4,044,356 | 8/1977 | Fournier . | |
| 4,210,023 | 7/1980 | Sakamoto et al. | 342/124 |
| 4,332,374 | 6/1982 | Kremer | 342/124 |
| 4,442,513 | 4/1984 | Mead . | |
| 4,933,916 | 6/1990 | May et al. . | |
| 4,940,015 | 7/1990 | Kobashi et al. | 118/723 |

Primary Examiner—Mark Hellner
Attorney, Agent, or Firm—Michael N. Meller

[57] ABSTRACT

An in-furnace level meter for measuring a slag level, or the like, in a convertor, and an antenna used therefore. An antenna position is controlled so that the distance between the antenna inserted in the convertor and the slag level can be established to be constant or within a predetermined range. A water-cooled structure antenna is used as the antenna.

11 Claims, 16 Drawing Sheets

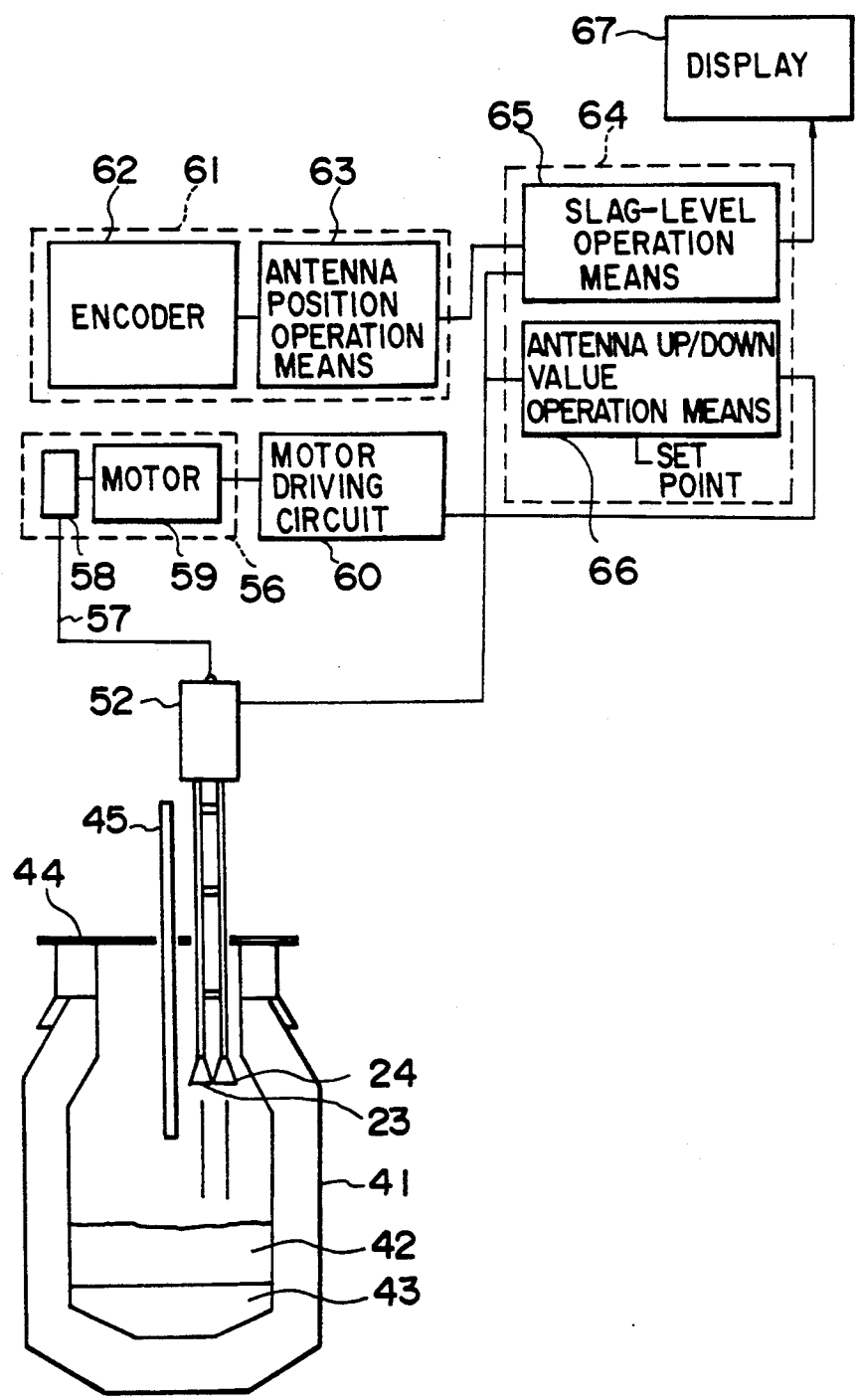

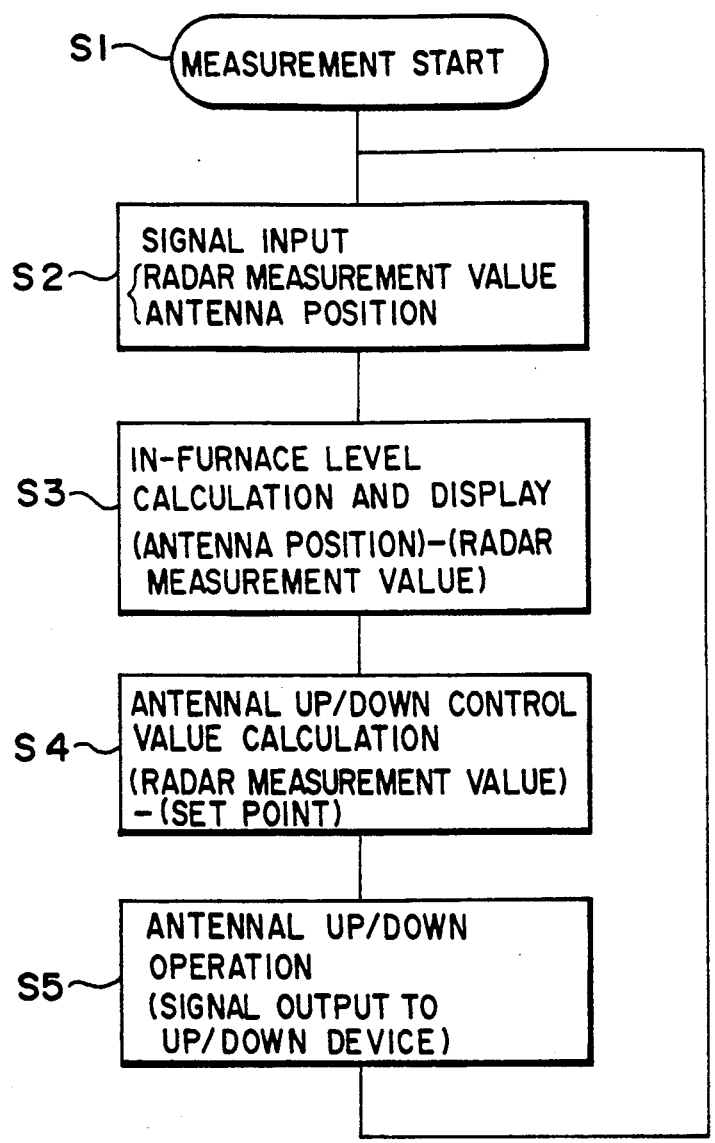

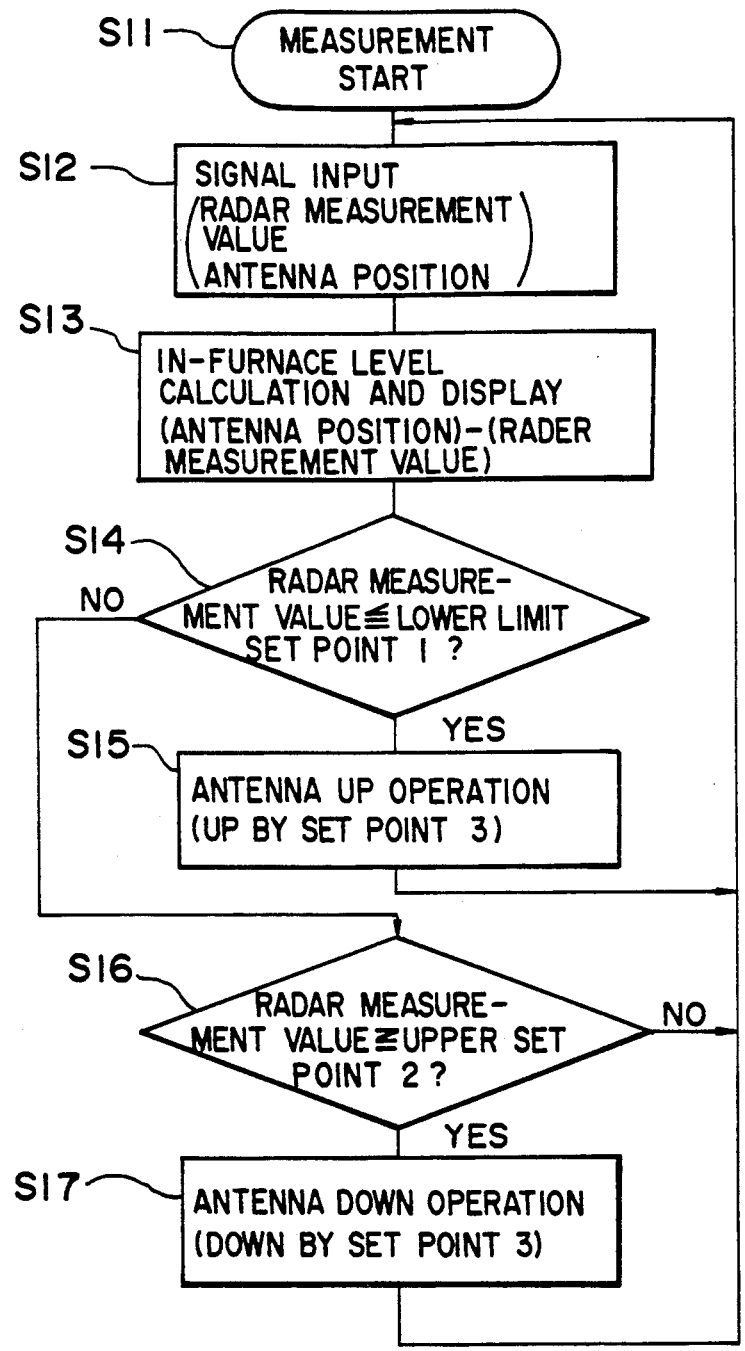

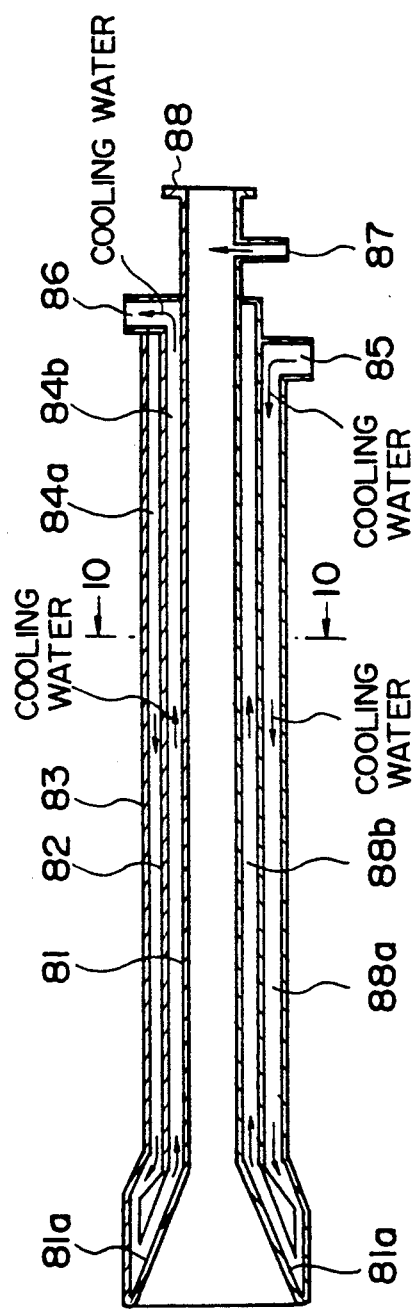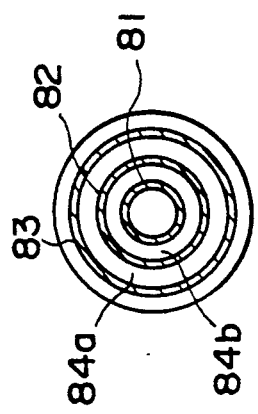

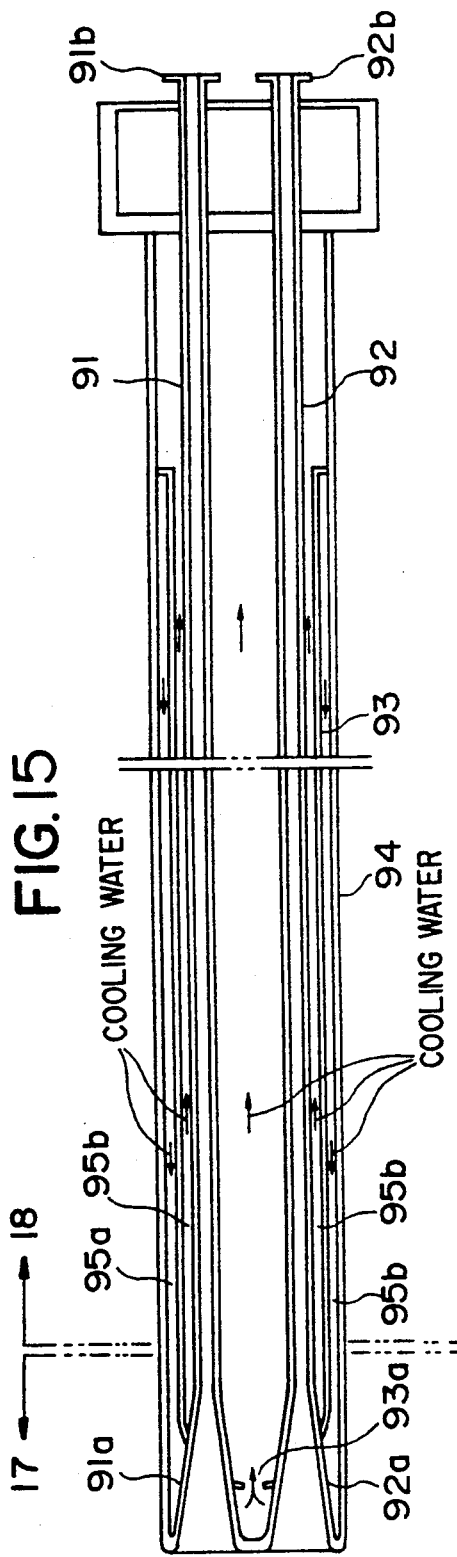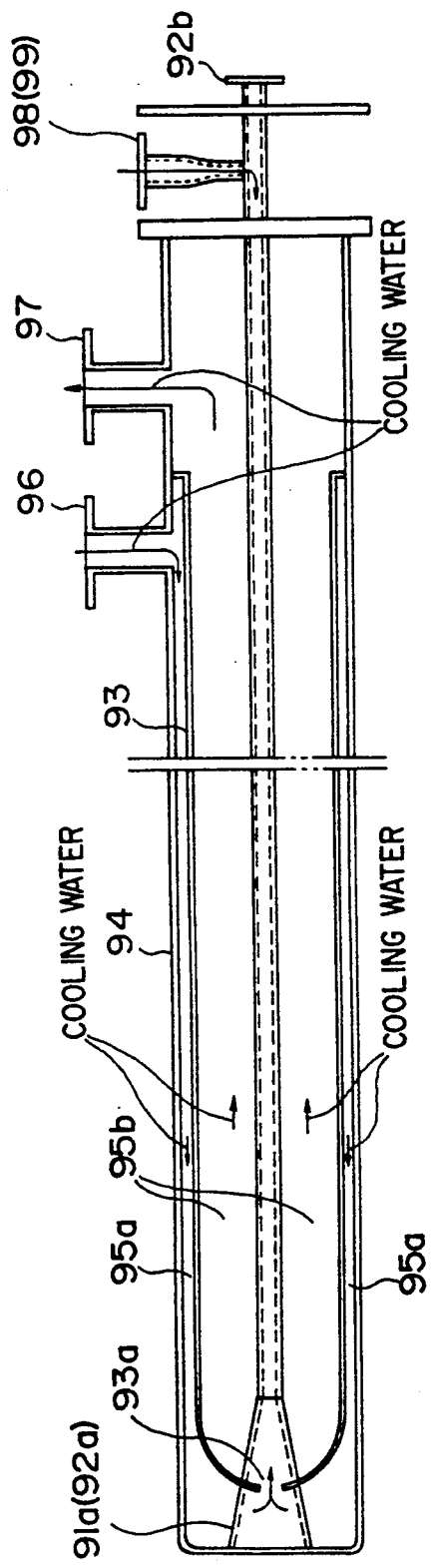

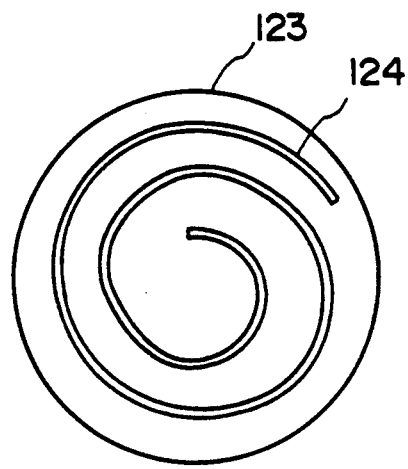
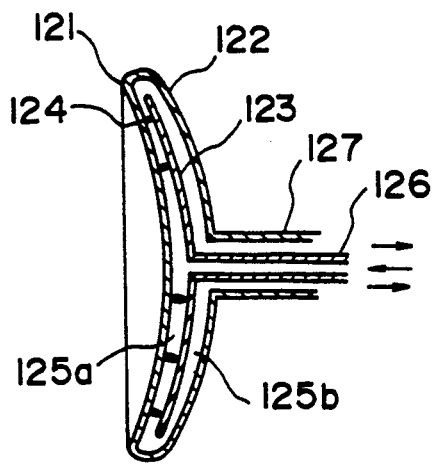
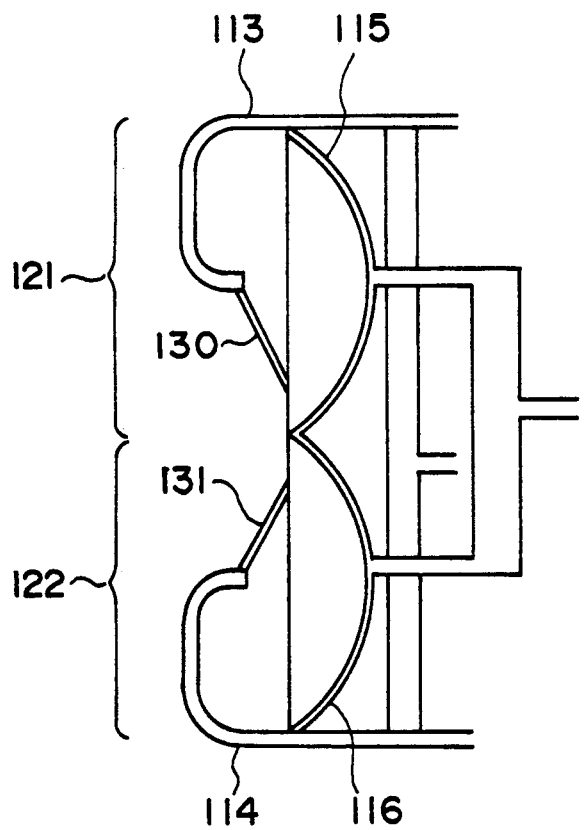
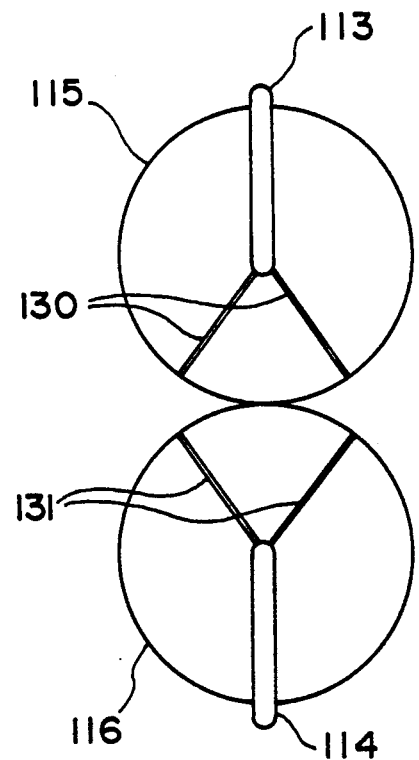

IN-FURNACE LEVEL METER AND ANTENNA THEREFORE

BACKGROUND OF THE INVENTION

The present invention relates to an in-furnace level meter for measuring levels of in-furnace slag, melt, raw material, etc. in a convertor or the like by utilizing a microwave, and relates to an antenna for use in the in-furnace level meter.

In a conventional in-furnace level meter, for example, a microwave radar is provided at a furnace top of a convertor so that electromagnetic wave transmitted by the microwave radar through a waveguide and a transmission antenna is reflected on a slag surface. The electromagnetic wave thus reflected is received through a reception antenna and a waveguide and then subjected to signal processing to measure the distance between the microwave radar and the in-furnace slag surface.

As the microwave radar for use for such measurement, there are various kinds of measurement systems as follows:

One of those systems is, for example, an FM-CW microwave radar system. As disclosed in Japanese Patent Laid-Open Publication No. 63-21584 this measurement system comprises the steps of: transmitting a microwave formed by frequency-modulating a continuous microwave of about 10 GHz, from an antenna toward a level surface; and counting a beat frequency produced by mixing the transmission signal with the wave reflected on the level surface to thereby measure the distance between the microwave radar and the level surface. That is, the distance measurement in this measuring system is based on the fact that the propagation time of the microwave required for reciprocating the distance between the antenna and the level surface corresponds to the aforementioned beat frequency.

Another measurement system is a pulse-modulated microwave radar system. This measurement system comprises the steps of: pulse-modulating a microwave having a frequency of about 10 GHz to about 20 GHz and transmitting the pulse-modulated microwave as in an ordinary airplane radar; and measuring distance between the radar and the level surface on the basis of the fact that the propagation time of the microwave required for receiving the microwave reflected on the level surface is proportional to the distance between the radar and the level surface.

In the conventional in-furnace level meter using such a microwave radar, the transmission antenna and the reception antenna are fixed to specific positions at the furnace top portion of the convertor or in the furnace. Accordingly, there arise the following problems as to the change of the slag level in the furnace.

In the case where the transmission and reception antennas are fixed at the furnace top portion, the slag level position cannot be often measured accurately because of the influence of unnecessary signals reflected from the in-furnace lance, the furnace opening portion and the furnace wall portion when the distance between the transmission and reception antennas and the slag level increases as the slag level in the furnace decreases.

In the case where the transmission and reception antennas are fixed at the deep portion inside the furnace, the slag level position cannot be often measured accurately because of occurrence of signal attenuation, blockade of the transmission and reception antennas, etc. caused by the deposition of scattered slag, ground metal, dust, etc. on the transmission and reception antennas when the distance between the transmission and reception antennas and the slag level decreases as the slag level in the furnace increases.

SUMMARY OF THE INVENTION

An object of the present invention is to provide an in-furance level meter which can measure a slag level position accurately and continuously even when the slag level in a furnace changes and which can be used even when the atmospheric temperature in the furnace is considerably high, and an antenna used in the in-furnace level meter.

Another object of the present invention is to provide an in-furnace level meter which can measure a level position of a target or a distance to the target accurately and continuously by using a low-cost apparatus without influence of the measurement environment in which dust or the like is present.

According to an aspect of the present invention, the in-furnace level meter has a microwave radar having a transmission antenna and a reception antenna inserted in a furnace, the microwave radar generating a microwave signals to the transmission antenna and generating a radar measurement value signal by calculating a distance between the antennas and a slag surface on the basis of the microwave signal reflected on the slag surface in the furnace and received by the reception antenna. The transmission antenna and the reception antenna are moved up/down by an antenna up/down device. The antenna position is measured by an antenna position measurer. A signal processing section calculates an in-furnace slag level position on the basis of both the radar measurement value signal of the microwave radar and the antenna position signal of the antenna position measurer and calculates an antenna up/-down distance by comparing the in-furnace slag level position with a set point or upper-limit and lower-limit set points, to thereby supply the antenna up/down distance as the antenna up/down control signal to the antenna up/down means.

The antenna up/down device performs antenna up/-down control on the basis of the antenna up/down control signal to keep the distance between the transmission and reception antennas (hereinafter collectively called "antenna") and the slag level at a predetermined value.

Accordingly, the distance between the antenna and the slag level is always kept constant or in a predetermined distance range even when the slag level in the furnace changes. Therefore, it is possible to eliminate the disadvantage that there is a bad influence of unnecessary signals reflected on the in-furnace lance and the furnace wall when the distance between the antenna inserted in the furnace and the slag level increases as the slag level in the furnace decreases.

Further, it is possible to eliminate the disadvantage that scattered slag, ground metal, etc. is deposited on the antenna when the antenna inserted in the furnace approaches to the slag level as the slag level in the furnace increases.

According to another aspect of the present invention, the antenna for use in the in-furnace level meter has an inner metal pipe having an inside portion serving as a waveguide and an enlarged-diameter portion disposed at a top end thereof and serving as a horn antenna, and an outer metal pipe surrounding the inner pipe. The top end of the enlarged-diameter portion of the inner pipe is joined to the top end of the outer pipe while disposing a partitioning member substantially entirely between the inner pipe and the outer pipe, so that two cooling water paths communicated with each other at the top end of the two pipes are formed. A water inlet and a water outlet for cooling water are provided at the base end sides of the cooling water paths. Accordingly the heat which the inner and outer pipes receive in the furnace is removed by cooling water flowing in the cooling water paths, so that the inner and outer pipes are cooled efficiently. Accordingly, both the directivity and S/N can be improved even when the atmospheric temperature in the furnace is considerably high.

According to a further aspect of the invention, a gas purge for introducing a purge gas is provided at the base end side of the inner pipe. The purge gas is introduced into the gas purger provided at the base end side of the inner pipe and released from the top end of the inner pipe, so that the top-end inner surface in the enlarged-diameter portion of the inner pipe serving as an antenna is purged to make maintenance easy with spoiling the cooling effect due to cooling water.

According to a further aspect of the invention, the antenna used in the in-furnace level meter has first and second inner metal pipes each of which has an inside portion serving as a waveguide and an enlarged-diameter portion disposed at a top end thereof and serving as a horn antenna. The enlarged-diameter portions at the top ends of the inner pipes and the top end portion of the outer pipe are joined to each other while disposing a partitioning member substantially entirely between the inner pipes and the outer pipe, so that two cooling water paths communicated with each other at the top ends of the two pipes are formed. A water inlet and a water outlet for cooling water are provided at the base end sides of the cooling water paths.

Accordingly, the two cooling water paths communicated with each other at the top ends of the inner and outer pipes are formed. The heat which the inner and outer pipes receive in the furnace is removed by cooling water flowing in the cooling water paths, so that the antenna is cooled efficiently. Accordingly, the antenna can be used even when the atmospheric temperature in the furnace is considerably high.

In the water-cooled horn antenna constructed as described above, a gas purger may be provided at the base end sides of the inner pipes. The top-end inner surfaces in the enlarged-diameter portions of the inner pipes serving as a horn antenna are purged by introducing a purge gas into the gas purger, so that maintenance of the antenna is made easy without spoiling the cooling effect due to cooling water.

According to a further aspect of the invention, the antenna for in the in-furnace level meter has a water-cooled structure primary radiator, and a water-cooled structure reflector having a parabola curved surface opposite to an aperture surface of the primary radiator. The primary radiator is constituted by a water-cooled structure waveguide and feeder having a double or treble pipe structure.

As described above, the primary radiator forms cooling water paths based on the double or treble pipe structure, so that the heat received by the waveguide and feeder is removed by cooling water flowing in the cooling water paths.

According to a further aspect of the present invention, the microwave radar measures the distance to a target through the steps of: transmitting a carrier phase-modulated on the basis of a first pseudo random signal toward a target; obtaining a time-series pattern of a detection signal by detecting a carrier obtained by multiplying a reception signal reflected on the target by a second pseudo random signal; obtaining a time-series pattern of a multiplication value by directly multiplying the first and second pseudo random signals by each other; and measuring the time difference between the time-series pattern of the detection signal and the time-series pattern of the multiplication value. Accordingly, the following effects can be attained.

(1) Because of non-contact measurement, durability of sensor portions such as an antenna, etc. can be secured and, at the same time, both the device attachment and maintenance can be simplified.

(2) Because of continuous measurement, a measurement of high response can be made.

(3) Because spectrum-diffused signals using pseudo random signals are used, both the noise reduction and signal emphasis can be attained by application of a correlation processing using a reference pseudo random signal in the reception portion. Accordingly, the wave reflected on a target having a low reflectivity can be detected sensitively, so that the measurement can be used for wide purposes.

(4) Because the high-speed signal conventionally used for a measurement can be converted into a low-speed signal by a circuit relatively simple in construction according to the invention, a low-cost and small-size apparatus can be provided. Further, adjustment is made easy.

As means for detecting a carrier reflected on the target and subjected to a correlation processing after reception to obtain a detection signal, an in-phase component and a quadrature component as to the phase of the transmission carrier are extracted from the carrier after the correlation processing. The components are respectively squared through low-pass filters and then added to each other to obtain a detection signal. Accordingly, the target can be detected sensitively.

Because the measurement time between a detection signal obtained from a target and a reference signal is very greatly enlarged (for example, 12,500 times) on a time axis by a technique of transmitting a phase-modulated carrier based on a first pseudo random signal to the target and then applying a correlation processing to the reception signal reflected on the target using a second pseudo random signal having the same pattern as the first pseudo random signal and having a frequency near the frequency of the first pseudo random signal, the distance is short. Further, the necessary signal reflected on the target as a subject of the measurement can be clearly discriminated separated from unnecessary signals reflected on other matters than the target, on the time axis in which the detection signal is generated. Accordingly, the level on the furnace can be measured stably even under measurement environment of narrow space such as the inside of the furnace in which unnecessary reflected signals will be generated easily, because the unnecessary reflected signals can be removed.

That is, in the present invention, a first pseudo random signal and a second pseudo random signal having the same pattern as that of the first pseudo random signal and having a frequency slightly different from the frequency of the first pseudo random signal are generated by a first pseudo random signal generation means and a second pseudo random signal generation means, respectively. A spectrum-diffused signal formed by phase-modulating a carrier on the basis of the first pseudo random signal is transmitted toward a target by a transmission means. Then, a reception signal obtained by receiving the wave reflected on the target by a reception means is multiplied by the second pseudo random signal through a second multiplier. When the modulated phase of the reception signal phase-modulated with the first pseudo random signal coincides with the phase of the second pseudo random signal, the result of multiplication; obtained as an output from the second multiplier becomes an in-phase carrier and is subject to synchronous detection by a coherent detector means in the succeeding stage. The detection output is further signal processed through a detection signal generation means constituted by a pair f low-pass filters, a pair of squarers and an adder to thereby output a pulse-like target detection signal. However, the first and second pseudo random signals are equal to each other in the code pattern thereof but slightly different from each other in the frequency of the signal generator means. Accordingly, the phases of the two signals become shifted from each other with the passage of time after the phases of the two signals coincide with each other (that is, the correlation output of the two signals takes its maximum value). When the phases of the two signals are shifted from each other by one code length or more, the correlation of the two pseudo random signals is lost. In this condition, the phase of the carrier obtained as a result of multiplication of the reception signal by the second pseudo random signal becomes random, so that the frequency band is restricted by the low-pass filters after synchronous detection by the coherent detector means in the succeeding stage and it is impossible to obtain a target detection signal.

When the phase difference between the first and second pseudo random signals becomes just equivalent to one period of one pseudo random signal after time is further passed, the phases of the two signals become coincident with each other again. In this condition, the correlation output of the two signals takes its maximum value again so that a pulse-like target detection signal is obtained again through the coherent detector means and the detection signal generator means. Thus, this phenomenon is repeated at regular time intervals so that a cyclic pulse-like signal can be obtained as a target detection signal.

On the other hand, the setting of reference time is necessary for measuring the point of time when the target detection signal is obtained from the reception signal. Therefore, a time reference signal for representing the reference time is generated as follows. The first pseudo random signal is directly multiplied by the second pseudo random signal through the first multiplier; Then, a time series pattern as a result of the multiplication is picked up through a low-pass filter, so that a pulse-like signal having the same period as that of the target detection signal is obtained as the time reference signal.

Accordingly, because the time from the point of time when the time reference signal is generated to the point of time when the target detection signal obtained from the reception signal is generated is proportional to the propagation time taken for the electromagnetic wave to move forth and back between the transmission/reception antenna and the target, the distance between the transmission/reception antenna and the target can be calculated from the time difference between the two signals.

The aforementioned operation is formulated as follows:

Let $f_1$ be the repetition frequency of the first pseudo random signal. Let $f_2$ be the repetition frequency of the second pseudo random signal. It is now assumed that the patterns of the two pseudo random signals are equal to each other and that $f_1$ is larger than $f_2$.

When the period in which the reference signal obtained on the basis of correlation of the first and second pseudo random signals transmitted takes its maximum is replaced by TB, the different in the number of waves between the first and second pseudo random signals contained in the period TB is equal to the number N of one-period waves. That is, the following equation is obtained.

$$TB.f_1 = TB.f_2 + N$$

Rearranging the equation, TB is represented by the following equation (1).

$$TB = N/(f_1 - f_2) \tag{1}$$

That is, the period TB in which the reference signal takes its maximum increases as the difference between the two clock frequencies decreases.

Let $\tau$ be the propagation time from the point of time when the carrier phase-modulated with the first pseudo random signal is transmitted to the point of time when the carrier is received after reflected on the target. Let TD be the time difference between the point of time when the pulse-like signal of the target detection signal obtained by demodulating the reception signal on the basis of the second pseudo random signal and coherently detecting it is generated and the point of time when the pulse-like signal of the reference signal is generated. Because the number of waves of the second pseudo random signal generated in the period TD is smaller, by the number of waves of the first pseudo random signal generated the propagation time $\tau$ than the number of waves of the first pseudo random signal generated in the period TD, the following equation is established.

$$TD.f_2 = TD.f_1 - \tau.f_1$$

Rearranging the equation, TD is represented by the following equation (2).

$$TD = \tau.f_1/(f_1 - f_2) \tag{2}$$

That is, the period TD is measured as a value obtained by elongating the propagation time by $f_1(f_1-f_2)$ times or in other words reducing the measurement speed by $f_1(f_1-f_2)$ times. It may be said that a distance measuring system or apparatus essentially suitable for short-distance measurement can be provided according to the invention by enlarging the measurement time.

Here, the propagation time is exposed by the equation:

$$\tau = 2x/v$$

In which v represents the propagation speed, and x represents the distance to the target.

Accordingly, the following equation (3) is obtained on the basis of the equation (2).

$$x = \frac{f1 - f2}{2f1} \cdot v \cdot TD \quad (3)$$

In short, the distance x can be measured by measuring the time difference TD according to the equation (3).

The above and other objects as well as advantageous features of the invention will become clearer from the following description taken in conjunction with the drawings.

BRIEF DESCRIPTION OF THE DRAWINGS

FIG. 4 is a block diagram showing an example of the configuration of the in-furnace level meter as an embodiment of the invention;

FIG. 5 is a flow chart showing an example of the antenna up/down control procedure in the embodiment of FIG. 4;

FIG. 7 is a flow charge showing another example of the antenna up/down control procedure in the embodiment of FIG. 4;

FIG. 9 is a view showing a water-cooled antenna as an embodiment of the invention;

FIG. 10 is a sectional view taken along the line 10—10 of FIG. 15;

FIG. 15 is a sectional view taken along the line 15—15 of FIG. 14; FIG. 16 is a sectional view taken along the line 16—16 of FIG. 14;

FIG. 27 is a sectional view showing an example of the configuration of the reflector;

FIG. 28 is a view showing an example of the configuration of the spacer;

FIG. 29 is a side view of a water-cooled parabola antenna as another embodiment of the invention;

FIG. 30 is a front view of the antenna of the embodiment of FIG. 29;

DESCRIPTION OF THE PREFERRED EMBODIMENTS

Before description of an in-furnace level meter as an embodiment of the invention, a microwave radar as an important constituent member of the level meter will be described hereinbelow.

Figure 1:
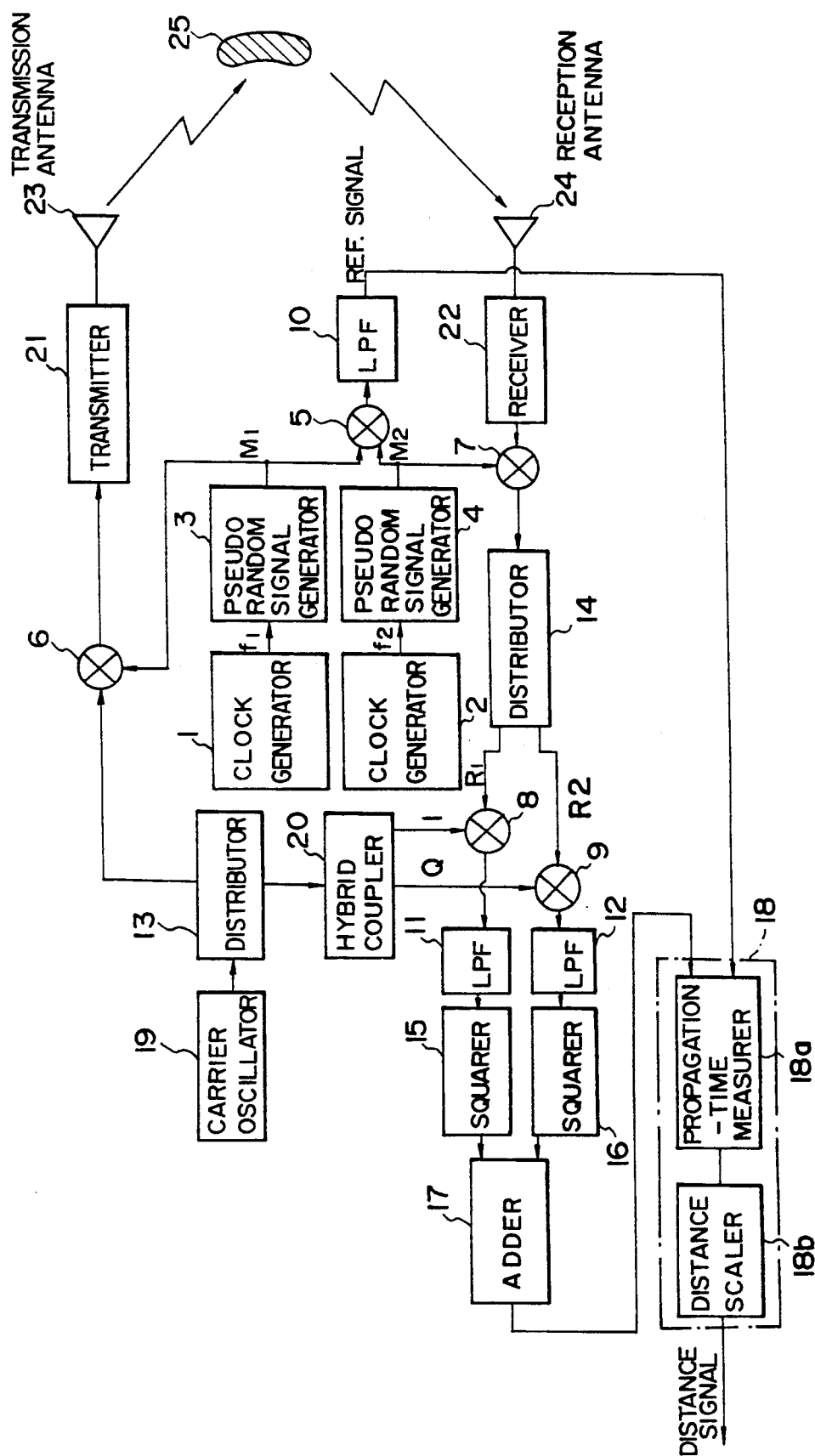
FIG. 1 is a block diagram showing an example of the configuration of a microwave radar to be applied to the in-furnace level meter according to the invention.

In a microwave radar in an embodiment of the invention depicted in FIG. 1, the reference numerals 1 and 2 designate clock generators respectively, and 3 and 4 designate pseudo random signal generators respectively. The reference numerals 5 through 9 designate multipliers, for example, constituted by double-balanced mixers respectively. The reference numerals 10 through 12 designate low-pass filters respectively, 13 and 14 designate distributors respectively, 15 and 16 designate squarers respectively, 17 designates an adder, 18 designates a time measurer, 19 designates a carrier oscillator, 20 designates a hybrid coupler, 21 designates a transmitter, 22 designates a receiver, 23 designates a transmission antenna, 24 designates a reception antenna and 25 designates a target.

Figure 2:
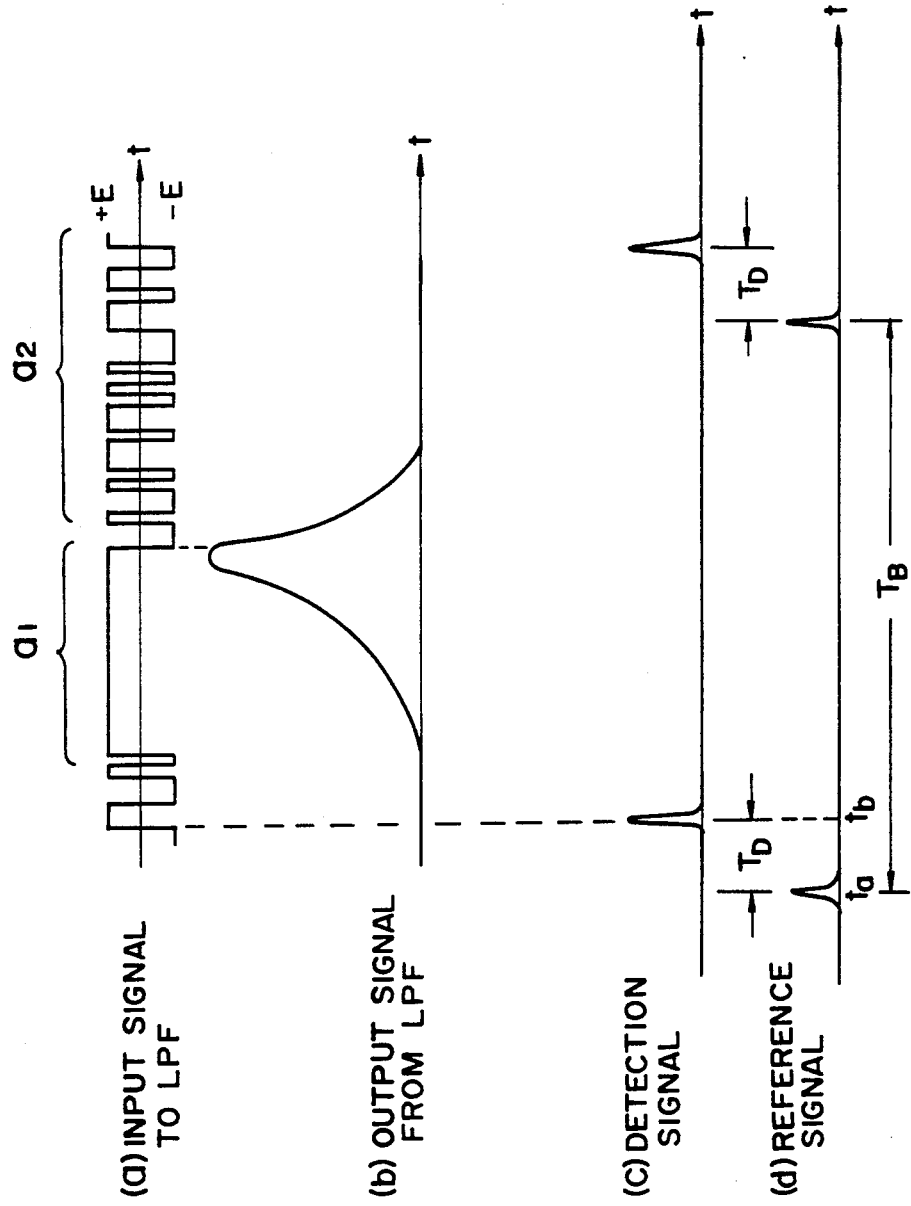
FIGS. 2a to 2d are views of waveforms for explaining the operation of the microwave radar depicted in FIG. 1.
Figure 3:
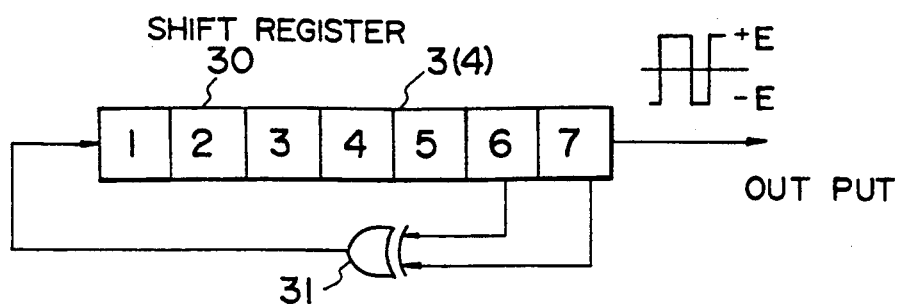
FIG. 3 is a view showing an example of the configuration of the 7-bit M-type signal generator.

Referring to the respective timing charts of the diagrams (a) through (d) of FIG. 2, the operation of the apparatus of FIG. 1 will be described. For example, each of the pseudo random signal generators 3 and 4 may be constituted by an M-type signal generator. The M-type signal generator may be a 7-bit M-type signal generator constituted by a shift register 30 of a 7-stage structure and an exclusive OR circuit 31, as shown in FIG. 3, the shift register 30 being of a 7-stage structure composed, for example, of ECL (emitter-coupled logic elements. The M-type signal is a periodically circulating signal having a combination of codes "1" and corresponding to a positive voltage +E) and "0" (corresponding to a negative voltage −E). In this example of 7 bits, one period is completed when 127 $(=2^7-1)$ signals (also called 127 signal-chips) are generated. Accordingly, in this example, a circulating signal repeating this period is generated.

Each of the pseudo random signal generators 3 and 4 is constituted by one and the same circuit, so that the output signals of the pseudo random signal generators 3 and 4 have the same pattern. However, the pseudo random signal generators 3 and 4 are slightly different in clock frequency supplied thereto, so that they are slightly different in one period thereof. Other than the M-type signal, a Gold-type signal or a JPL-type signal may be used as a pseudo random signal.

Each of the clock generators 1 and 2 includes a quartz oscillator by which a clock signal sufficiently stable in frequency is generated. However, the clock generators 1 and 2 are slightly different in the frequency generated. In this embodiment, the frequencies f1 and f2 generated by the clock generators 1 and 2 are 100.004 MHz and 99.996 MHz, respectively, so that the difference f1−f2 between the frequencies is 8 KHz. The clock signals f1 and f2 respectively generated from the clock generators 1 and 2 are respectively supplied to the pseudo random signal generators 3 and 4. The pseudo random signal generators 3 and 4 generate M-type signals M1 and M2 slightly different in one period thereof but of the same pattern, on the basis of the difference in frequency between the driving clock signals. Here, the respectively frequencies of the two M-type signals M1 and M2 can be calculated as follows:

(Frequency of M1)=127×1/100.004
MHz=1269.9492 ns (Frequency of M2)=127×1/99.996
MHz=1270.0508 ns Accordingly, the two M-type signals M1 and M2 have substantially the same period of about 1270 ns ($10^{-9}$ sec) but have a time difference of about 0.1 ns. Therefore, if the two Mp type signals M1 and M2 are circulated generated and then the patterns of the two M-type signals are matched with each other at a certain point of time ta, a time difference of 0.1 ns arises between the two signals whenever one period is passed, or in other words, a time difference of 10 ns arises between the two signals when 100 periods are passed.

Because the M-type signal has 127 signal-chips generated in a period of 1270 ns, the time required for generating one signal-chip is 10 ns. Accordingly, the fact that a time difference of 10 ns arises between the two M-type signals M1 and M2 represents the fact that the M-type signals are diverged by one signal-chip from each other. The output M1 of the pseudo random signal generator 3 is supplied to the multipliers 5 and 6. The output M2 of the pseudo random signal generator 4 is supplied to the multipliers 5 and 7.

For example, the carrier generator 19 generates a microwave having a frequency of about 10 GHz. The output signal of the carrier generator 19 is distributed, by the distributor 13, into the multiplier 6 and the hybrid coupler 20. For example, the multiplier 6 is constituted by a double-balanced mixer. The multiplier 6 multiplies the carrier of about 10 GHz fed from the distributor 13 by the M-type signal M1 fed from the pseudo random signal generator 3 and feeds the transmitter 21 with a spectrum diffused signal formed by phase-modulating the carrier.

The transmitter 21 power-amplifies the input spectrum diffused signal, converts it into an electromagnetic wave through the transmission antenna and radiates it toward the target 25. Because the wavelength of the electromagnetic wave having a frequency of 10 GHz is 3 cm in air and is sufficiently larger than the size (diameter) of dust in an iron-man manufacturing furnace, there is little influence of dust or the like. For example, each of the transmission antenna 23 and the reception antenna 24 is constituted by a horn antenna to narrow down the directivity sharply to thereby reduce electric power reflected on matters other than the target, as sufficiently as possible. For example, each of the transmission antenna 23 and the reception antenna 24 has an antenna gain of about 20 dB.

The electromagnetic wave radiated from the transmission antenna 23 toward the target 25 is reflected on the target 25, converted into an electric signal through the reception antenna 24 and fed to the receiver 22. Of course, the point of time when the input signal is supplied to the receiver 22 is delayed from the point of time when the electromagnetic wave is radiated from the transmission antenna 23 by the propagation time of the electromagnetic wave which is taken for the electromagnetic propagates forward from the transmission antenna 23 to the target 25 and then propagates back from the target 25 to the reception antenna 24. The receiver 22 amplifies the input signal and feeds the amplified signal to the multiplier 7.

On the other hand, the M-type signals M1 and M2 respectively fed from the pseudo random signal generators 3 and 4 to the multiplier 5 are multiplied by each other. The time series signal representing the multiplication value is supplied to the low-pass filter 10. The input signal to the low-pass filter 10, that is, the time series signal representing the output value of the multiplier 5, has a waveform as shown in the diagram (a) of FIG. 2. In the time region a1 in which the phases of the two pseudo random signals fed to the multiplier 5 are matched with each other, an output voltage +E is continued. In the time region a2 in which the phases of the two signals are not matched with each other, an output voltage +E and an output voltage −E are produced at random.

The low-pass filters 10 through 12 have a kind of integral function based on the band limitation for frequency. Accordingly, when the phases of the two signals are matched with each other, the output signal from the low-pass filters 10 through 12 as a signal formed by integrating correlative operation values of the two signals is a pulse-like signal as shown in the diagram (b) of FIG. 2. When the phases of the two signals are not matched with each other, the output signal from the low-pass filters has a value of 0. Therefore, a periodic pulse-like signal is produced in the output of the low-pass filter 10. The pulse-like signal as a reference signal for time is supplied to the time measurer 18. In this embodiment, the period TB of the reference signal calculated on the basis of the aforementioned equation (1) is 15.875 ms, because f1 and f2 are 100.004 MHz and 99.996 MHz, respectively. The reference signal and the period TB thereof are shown in the diagram (d) of FIG. 2.

The reception signal from the receiver 22 and the M-type signal M2 from the pseudo random signal generator 4 are fed to the multiplier 7 and multiplied by each other. When the modulated phase of the reception signal formed by phase-modulating the transmission carrier on the basis of the first M-type signal M1 is matched with the phase of the second M-type signal M2, the multiplication result from the multiplier 7 as a matched-phase carrier signal is supplied to the distributor 14. When the modulated phase of the reception signal is not matched with the phase of the M-type signal M2, the multiplication result from the multiplier 7 as a random-phase carrier signal is supplied to the distributor 14. The distributor 14 distributes the input signal into the two multipliers 8 and 9, that is, the two output signals R1 and R2 from the distributor 14 are supplied to the multipliers 8 and 9, respectively.

The hybrid coupler 20 supplied with a part of the transmission carrier from the distributor 13 supplies the multipliers 8 and 9 with an in-phase zero-phase component signal I having the same phase as the phase of the input signal and a quadrature (90°-phase) component signal Q having a phase perpendicular to the phase of the input signal, respectively. The multiplier 8 multiplies the signal I (that is, the signal having the same phase as that of the output from the carrier oscillator 19) fed from the hybrid coupler 20 and the aforementioned signal R1 fed from the distributor 14 by each other. Similarly to this, the multiplier 9 multiplies the input signal Q (that is, signal having a phase shifted by 90 degrees from the output of the carrier oscillator 19) and the aforementioned signal R2 by each other. Accordingly, the multipliers 8 and 9 respectively extract a zero-phase component (I. R1) and a 90°-phase component (Q.R2) from the reception signal and send out the two components as detected signals.

The signals I.R1 and Q.R2 as detected signals are supplied to the low-pass filters 11 and 12, respectively.

The low-pass filters 11 and 12 have an integral function based on band limitation of frequency. By the integral function, the low-pass filters 11 and 12 integrate correlative operation values of the two signals. That is, when the phase of the aforementioned signal R1 fed from the multiplier 7 to the multiplier 8 through the distributor 14 is matched with the phase of the aforementioned signal I fed from the hybrid coupler 20 to the multiplier 8 and then the aforementioned signal R2 fed to the multiplier 9 is matched with the signal Q fed to the multiplier 9, the output signals from the multipliers 8 and 9 become pulse signals of predetermined polarity (the voltage +E or the voltage −E) so that large voltages arise in the outputs of the low-pass filters 11 and 12 integrating the signals, respectively.

When the phase of the aforementioned signal R1 is not matched with the phase of the signal I and when the aforementioned signal R2 is not matched with the phase of the signal Q, the output signals from the multipliers 8 and 9 become pulse signals of randomly changed polarity (that is, the voltage +E and the voltage −E) so that zero voltage arises in the outputs of the low-pass filters 11 and 12 integrating the signals, respectively.

The zero-phase and 90°-phase components thus subjected to the integral processing through the low-pass filters 11 and 12 are supplied to the squarers 15 and 16, respectively. The squarers 15 and 16 respectively square the amplitudes of the input signals and feed the output signals as operation results to the adder 17. The adder 17 adds the two input signals to each other and supplies a pulse-like detection signal as shown in the diagram (c) of FIG. 2 to the time measurer 18.

It is now assumed that the point of time when the detection signal takes its maximum is tb. The aforementioned technique having the steps of detecting zero-phase and 90°-phase components of transmission carrier respectively from a signal formed by the correlation processing of the reception signal and the M-type signal M2, integrating the detection signals and then squaring the integrated signals respectively, and adding the pair of squared values to each other to obtain a target detection signal, is more or less complex in configuration but can obtain a high-sensitive target detection signal. As the correlative output of the pseudo random signal such as an M-type signal can be obtained, a high S/N measuring system to reduce the influence of noise for the purpose of signal emphasis can be provided. Of course, a detection technique using crystal may be employed according to the specification and cost because the technique is inferior in sensitivity but simple in configuration.

The time measurer 18 is composed of a propagation-time measurer 18a and a distance scaler 18b. The propagation-time measurer 18a measures the time TD between the point of time ta when the reference signal fed from the low-pass filter 10 takes its maximum and the point of time when the detection signal fed from the adder 17 takes its maximum. Therefore, the propagation-time measurer 18a has a function for detecting the time points when the two input signals respectively take the maximum values. For example, the time point when an input signal takes its maximum value can be detected by detecting the time point of turning-over of the input signal (from increase to decrease for time) while temporarily comparing the present sample value and the previous sample value successively obtained by sample-holding of the input voltage value on the basis of the clock signal. The time TD represents a time between the time point ta of generation of the maximum value of the reference signal as shown in the diagram (d) of FIG. 2 and the time point tb of generation of the maximum value of the detection signal as shown in the diagram (c) of FIG. 2. As shown in the aforementioned equation (2), the time TD can be calculated by increasing the propagation time $\tau$ required for the electromagnetic wave actually moving forth and back as to the distance between the transmission and reception antennas 23 and 24 and the target 25 by f1/(f1−f2) times. In this embodiment, the following equation (4) is obtained by increasing the time by 12,500 times, because f1=100.004 mhz and f2=99.996 MHz.

$$TD = 12,500\tau \tag{4}$$

The time TD as expressed by the equation (4) is obtained for each period TB of the reference signal.

Because the measurement time in the invention is enlarged very greatly, the distance to the target can be measured with high accuracy. Accordingly, it may be said that the measurement apparatus according to the invention is suitable to a level meter for measuring short distance such as in-furnace slag level, melt level, etc.

Accordingly, the distance x (meter) from the transmission and reception antennas 23 and 24 to the target 25 is represented by the following equation (5) when it is calculated according to the equation (4)

$$x = (f1 - f2)/2f1 \cdot v \cdot TD = 1.2 \times 10^4 \cdot TD \tag{5}$$

The operation expressed by the equation (5) is carried out by the distance scaler 18b to generate a distance signal.

The microwave radar used in this invention has become clear from the above description. Next, preferred embodiments if the invention as to the in-furnace level meter using the microwave radar will be described hereinbelow.

In the in-furnace level meter shown in FIG. 4, the reference numeral 41 designates a convertor, 42 designates a slag in the convertor 41, and 43 designates a melt in the convertor 41. The reference numeral 44 designates a hood for the furnace 41, and 45 designates a lance.

The reference numeral 52 designates a high-sensitive microwave radar using M-type signals processing. The structure of the microwave radar 52 is as described above and as shown in FIGS. 1.

The reference numeral 55 designates a waveguide for connecting the microwave radar 52 to the transmission antenna 23 and the reception antenna 24. The reference numeral 56 designates an antenna up/down device for moving up/down the transmission antenna 23 and the reception antenna 24 unified with the microwave radar 52 into one body and inserted in the furnace, relative to the furnace.

The antenna up/down device 56 is composed of a cable 57 for hanging down the microwave radar 52, a cable winder 58 for taking up the cable 57 and for veering out the cable 57, and a motor 59 for driving the cable winder 58. The reference numeral 60 designates a motor driving circuit for the motor 59.

The reference numeral 61 designates an antenna position measurer for measuring the in-furnace antenna position on the basis of the up/down value of the antenna up/down device 56. The antenna position measurer 61 is composed of an encoder 62 for detecting the quantity of rotation in the motor 59, and an antenna position operation means 63 for calculating the length of the cable taken up by the cable winder 58 on the basis of the detection signal of the encoder 62 and then calculating the antenna position on the basis of the cable length.

The reference numeral 64 designates a signal processing circuit for processing signals in the microwave radar 52 and the antenna position measurer 61 to calculate an antenna up/down value to thereby move up/down the antenna through the antenna up/down device 56.

The signal processing circuit 64 is composed of a slag-level operation means 65 for calculating the slag-level position of the in-furnace slag 42 on the basis of the radar measurement value of the microwave radar 52 and the antenna position signal of the antenna position measurer 61, and an antenna up/down value operation means 66 for calculating the antenna up/down value while comparing the slag-level position calculated by the slag-level operation means 65 with a predetermined set point or upper-limit and lower-limit set points. The reference numeral 67 designates a CRT display unit.

The operation of the in-furnace level meter in the aforementioned embodiment will be described with reference to the flow chart of FIG. 5 and the graph views of FIGS. 6a and 6b.

First, the measurement of the distance between the transmission and reception antennas 23 and 24 and the slag surface of the in-furnace slag 42 through the microwave radar 52 is started (step S1). Then, the radar measurement value signal representing the distance between the antenna and the slag surface and measured by the microwave radar 52 and the antenna position signal representing the antenna position in the furance and measured by the antenna position measurer 61 are inputted into the slag-level operation means 65 (step S2). The antenna position signal is obtained through the steps of; detecting the quantity of rotation in the motor 59 by the encoder 62; calculating the length of the cable taken up by the cable winder 58 on the basis of the detection value, by the antenna position operation means 63; and calculating the antenna position on the basis of the cable length.

By the slag-level operation means 65 in the signal processing, circuit 64, the in-furnace slag-level position is calculated on the basis of the radar measurement value signal of the microwave 52 and the antenna position signal of the antenna position measurer 61. That is, the slag-level position is calculated by subtracting the distance between the antenna and the slag surface from the antenna position, and is displayed by the display unit 67(step S3).

Then, the antenna up/down operation means 66 in the signal processing circuit 64 compares the distance value represented by the radar measurement value signal of the microwave radar 52 with a predetermined set point (for example, the distance between the antenna and the slag surface is always established to be 2.0 m), calculates the difference therebetween as and antenna up/down value and feeds an antenna up/down signal representing the antenna up/down value to the motor driving circuit 60 (step S4). The slag-level operation means 65 and the antenna up/down value operation means 66 in the signal processing circuit 64 receive a value obtained by averaging the measurement value fed from the microwave radar 52 for 10 seconds as a radar measurement value signal.

The motor driving circuit 60 supplied with the antenna up/down signal from the antenna up/down value operation means 66 rotates the motor 59 to actuate the cable winder 58 to perform the taking-up or feeding-out of the cable 57 to move up/down the antenna by the antenna up/down value (step S5).

Figure 6A:
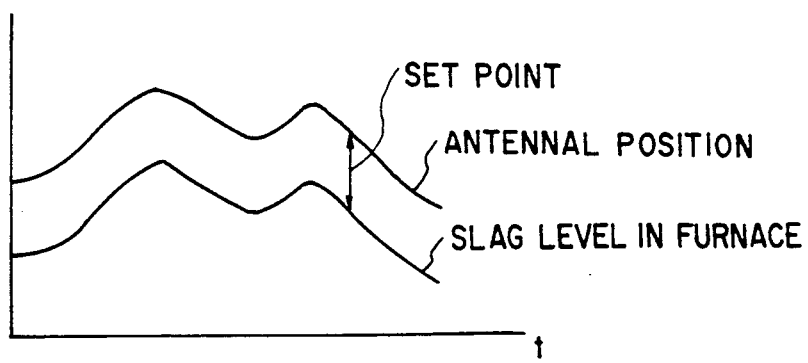
FIG. 6a is a graph view showing the relationship between the antenna position and the slag surface.
Figure 6B:
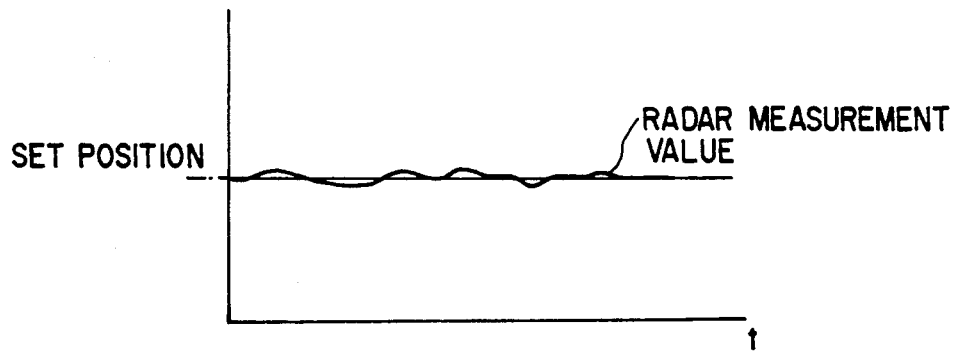
FIG. 6b is a graph view showing the relationship between the set point and the radar measurement value.

The aforementioned antenna up/down control is repeatedly carried out with the passage of time, so that the antenna position can be kept at a constant distance from the slag surface of the in-furnace slag 42, that is, can be kept at a set point though the slag level may change as shown in FIG. 6a. FIG. 6b shows the relationship between the set point and the radar measurement value representing the distance between the antenna and the slag surface of the slag 42, with the passage of time in such antenna up/down control. The control in this embodiment is used when the change of the slag surface of the slag 42 is relatively small.

Figure 8:
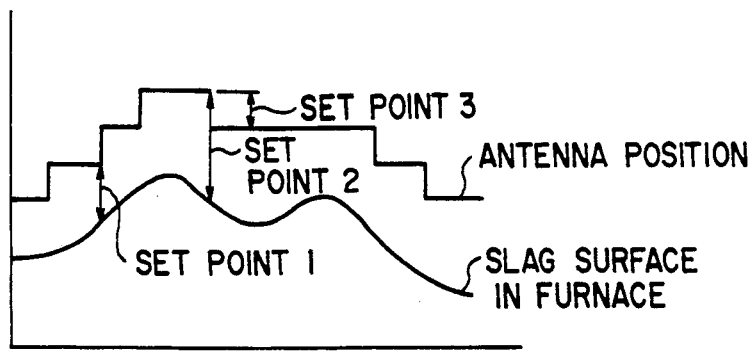
FIG. 8a is a graph view showing the relationship between the antenna position and the slag surface.
FIG. 8b is a graph view showing the relationship between the set point and the radar measurement value.
Figure 8:
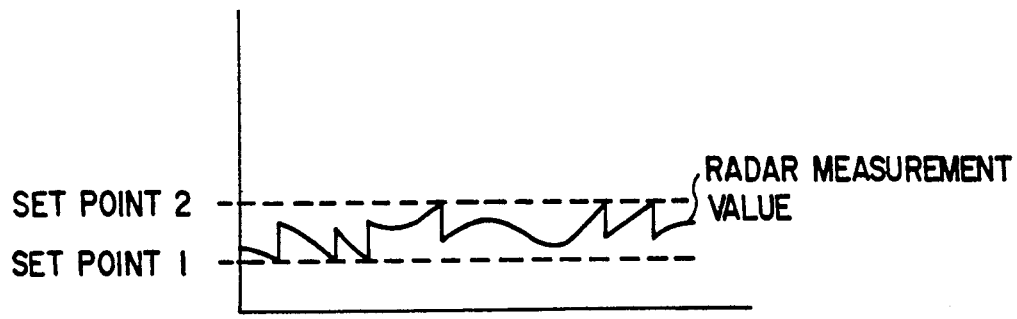

Further, another example of antenna up/down control will be described with reference to the flow chart of FIG. 7 and the graph views of FIGS. 8a and 8b.

Figure 11:
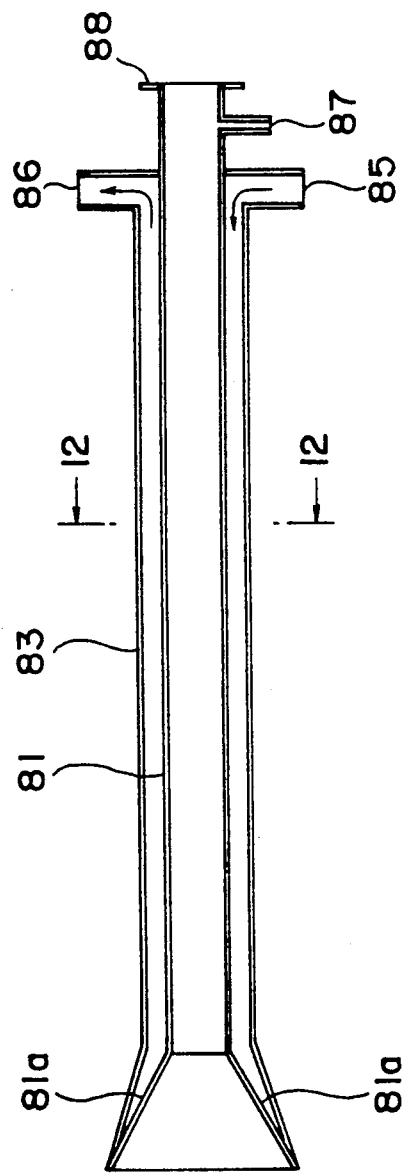
FIG. 11 is a view showing a water-cooled antenna as another embodiment of the invention.

First, the procedure from the step S11 of starting the measurment of the distance between the antenna and the slag surface of the slag 42 through the microwave radar 52 to the step S13 of calculating the slag-level position of the slag 42 and displaying the slag-level position through the display unit 67 is made in the same manner as shown in the flow chart of FIG. 11.

Then, by the antenna up/down value operation means 66 in the signal processing circuit 64, the radar measurement value signal fed from the microwave radar 52 is compared with a predetermined lower limit set point 1(1.5 m) (step S14). When the distance value represented by the radar measurement values signal is not larger than the lower-limit set point 1, an antenna up/down control signal for a predetermined antenna up value (1.0 m) is generated to make the antenna up/down device 56 move up the antenna by 1.0 m (step S15) and then the situation of the procedure returns too the step S12. When the distance value represented by the radar measurement values signal is larger than the lower -limit set point 1, the distance value is compared with an upper-limit set point 2 (3.0 m) (step S16). When the radar measurement value is not smaller than the upper-limit set point 2, an antenna up/down control signal for a predetermined antenna down value (1.0 m) is generated to make the antenna up/down device 56 move down the antenna by 1.0 m (step S17). When the radar measurement value is smaller than the upper-limit set point 2, the situation of the procedure returns to the step S12.

In such a step, the antenna up/down control is made so that the distance between the antenna position and the slag surface of the slag 42 can be kept in a predetermined range. Such control is repeatedly made with the passage of time, so that the antenna position can be kept in a predetermined range of distance from the slag surface of the slag 42, this is, can be kept between the upper-limit set point and the lower-limit set point though the slag surface may change as shown in FIG. 8a. FIG. 8b shows the relationship between the upper-limit and lower-limit set points and the radar measurement value representing the distance between the antenna and the slag surface of the slag 42, with the passage of time in such antenna up/down control. The control in this embodiment is used when the change of the slag surface of the slag 42 is relatively large.

Because the antenna up/down control in the aforementioned embodiment is made so that the antenna position can be kept at a predetermined distance from the slag surface of the slag 42 or in a predetermined range of distance from the slag surface though the slag surface of the slag 42 in the furnace may change, the disadvantage in the prior art in that the bad influence of unnecessary signals reflected on the lance 45 and the wall in the furnace is produced by moving down the slag surface of the slag 42 in the furnace to increase the distance between the antenna inserted in the furnace and the slag surface can be avoided. Further, deposition of scattered slag, metal ground, etc. on the antennas 53 and 54 caused by moving up the slag surface of the slag 42 in the furnace to approach the antennas 53 and 54 inserted in the furnace to the slag surface can be prevented. Accordingly, in the in-furnace level meter using the microwave radar 52, the level of the in-furnace slag 42 can be always normally measured.

Because the influence of, deposition of the slag on the antenna and the influence of unnecessary signals reflected on the furnace wall, etc. are produced easily, in particular, in the slag-level measurement in the convertor 41 as the reflection of microwave on the slag surface is weak, the effect of application of the invention is large.

Although the aforementioned embodiment has shown the case where the invention is applied to the measurement of a slag level in the convertor 41, it is a matter of course that the invention can be applied to the measurement of a slag level in a convertor, the measurement of a melt level in a furnace, and the measurement of a raw material level in a shaft furnace.

Although the aforementioned embodiment has shown the case where each of the antennas inserted in the furnace is constituted by a trumpet-shaped horn antenna free from cooling, it may be desired that an air-cooled antenna or a water-cooled antenna is used according to the environmental condition in the furnace using the in-furnace level meter.

Such water-cooled antennas are shown in FIGS. 9 through 22. In the structural view of a water-cooled antenna shown in FIG. 9 and the sectional view of FIG. 10 taken along the line 10—10 of FIG. 9, the reference numeral 81 designates an inner round pipe made of copper and having a length of about 1000 mm and a diameter of 25 mm. The inner round pipe 81 has an enlarged-diameter portion 81a provided at a top end (left end in the drawing) and having a length of about 200 mm and a taper angle of $\leq 3-10°$. The whole inside of the inner round pipe 81 serves as a waveguide, and the top inside of the enlarged-diameter portion 81a serves as a horn antenna. The inner diameter of the inner round pipe 81 is designed to be in a wavelength range of $0.66\lambda$ to $0.91\lambda$ in the microwave used. The reference numeral 82 designates an intermediate round pipe made of steel to surround the inner round pipe 81 and having a length of about 800 mm for functioning as a partitioning member and a diameter of 40 mm. The reference numeral 83 designates an outer round pipe made of steel to surround the inner round pipe 81 and the intermediate round pipe 82 and having a length of about 800 mm and a diameter of 60 mm. The top end of the enlarged-diameter portion 81a of the inner round pipe 81 and the top end of the outer round pipe 83 are joined to each other by welding so that a gap formed between the top ends thereof is closed.

Entirely between the inner pipe 81 and the outer pipe 83, two cooling water paths 84a and 84b communicated with each other at the top end side of the inner and outer round pipes 81 and 83 are formed by the intermediate round pipe 82 serving as a partitioning member. The reference numeral 85 designates a water inlet provided at a base end side (right end side in the drawing) of the cooling water path 84a at the side of the outer round pipe 83. The reference numeral 86 designates a water outlet provided at a base end side (right end side in the drawing) of the cooling water path 84b at the side of the inner round pipe 81. The reference numeral 87 designates a gas purger communicated with the inside of the inner round pipe 81 and having a diameter of 6 mm. The diameter of the gas purger is designed to be not larger than one-fourth the wavelength of the microwave used. The reference numeral 88 designates a flange provided at the base end of the inner round pipe 81.

In the water-cooled antenna having the aforementioned structure, if cooling water is introduced through the water inlet 85 into the outer round pipe 83-side cooling water path 84a as one of the two cooling water paths 84a and 84b formed by the intermediate pipe 82 serving as a partitioning member between the inner round pipe 81 and the outer round pipe 83, the cooling water is passed through the cooling water path 84a and reaches the inner round pipe 81 and the enlarged-diameter portion 81a. Then, the cooling water is passed through the other, inner round pipe 81-side cooling water path 84b and exhausted to the outside through the water outlet 86. Accordingly, the heat which the inner round pipe 81 in the furnace, its enlarged-diameter portion 81a and the outer round pipe 83 receive in the furnace is removed efficiently by cooling water flowing in the cooling water paths 84a and 84b. Accordingly, the inner round pipe 81 and the outer round pipe 83 have a heat resistance of atmospheric temperature 1500° C. Therefore, directivity is improved to obtain good S/N though the enlarged-diameter portion 81a of the inner round pipe 81 serving as an antenna maybe deeply inserted in the furnace. Accordingly, an accurate measurement can be made because the antenna gain is 20 dB when the frequency of the microwave used is 10 GHz.

When a purge gas such as a nitrogen gas, air, an argon gas, etc. is fluxed in the gas purger 87 provided at the base end side of the inner round pipe 81, the gas enters into the inner round pipe 81 and is put out at the top end of the inner round pipe 81, so that the top-end inner surface of the enlarged-diameter portion 81a of the inner round pipe 81 serving as an antenna is purged to make maintenance easy without spoiling the cooling effect due to the cooling water.

In this embodiment, the water inlet 84 is provided at the base end side of the outer round pipe 83 side cooling water path 84a so that the outer surface of the outer round pipe 83 is cooled by fresh cooling water. This is because the outer surface of the outer round pipe 83 being located in the furance and being in contact with hot air can be cooled efficiently as the inner surface of the inner round pipe 82 is prevented from contact with hot air in the furnace by the gas purge.

Figure 13:
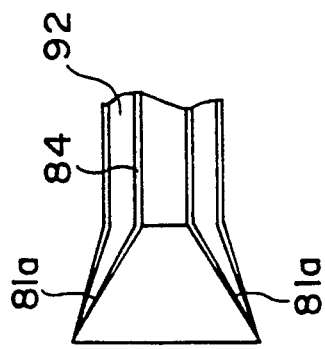
FIG. 13 is an explanatory view showing a partitioning member disposed between an inner round pipe and an outer round pipe.
Figure 12:
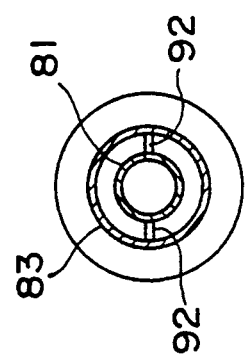
FIG. 12 is a sectional view taken along the line 12—12 of FIG. 11.

In the configuration view of FIG. 11 showing a further embodiment of the water-cooled antenna, the sectional view of FIG. 12 taken along the line 12—12 of FIG. 11 and the explanatory view of FIG. 13 showing a partitioning member disposed between the inner round pipe and the outer round pipe, the same parts as those in the embodiment shown in FIGS. 9 and 10 are referenced correspondingly and the description of the same configuration is omitted. In this embodiment a partitioning plate 92 is disposed between the inner round pipe 81 and the outer round pipe 83 to thereby form two cooling water paths 84a and 84b. This embodiment has an advantage in that manufacturing cost is low, compared with the previous embodiment. The operation and effect in this embodiment are similar to those in the previous embodiment. Accordingly, description of the operation and effect in this embodiment will be omitted.

Although these embodiments show the case where the inner round pipe 81 is substantially made of copper, it is a matter of course that the inner round pipe 81 except the inner surface thereof made of copper may be made of steel if the inner round pipe 81 can serve as a waveguide.

Although the embodiments as shown in FIGS. 9 through 13 show the case where the shape of each of the inner and outer pipes is round, it is a matter of course that the invention can be applied to the case where the shape of each of the inner and outer pipes may be quadrilateral or polygonal. In the case where the inner pipe is quadrilaterally shaped, the diameter of the long side and the diameter of the short side are designed to be in a range of from $0.62\lambda$ to $0.95\lambda$ and a range of from $0.28\lambda$ to $0.42\lambda$ respectively.

Figure 14:
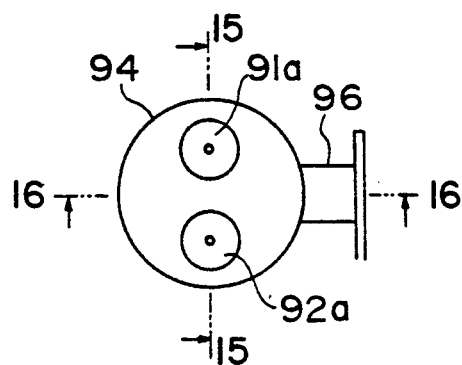
FIG. 14 is a side view of a water-cooled horn antenna as a further embodiment of the invention and taken from a front end side thereof.
Figure 17:
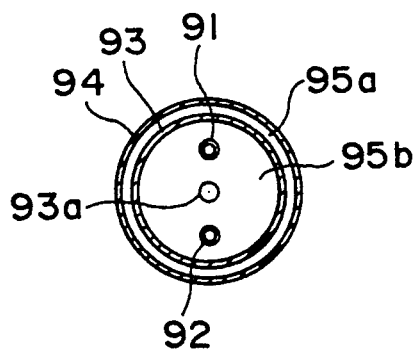
FIG. 17 is a sectional view taken along the line 17—17 of FIG. 15 and showing a front end side of the antenna.
Figure 18:
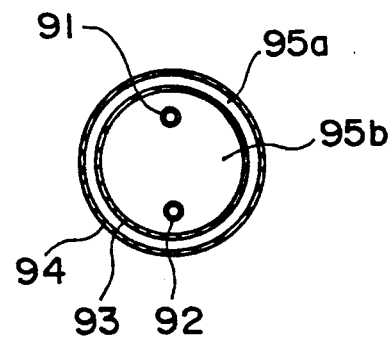
FIG. 18 is a sectional view taken along the line 18—18 of FIG. 15 and showing a base end side of the antenna.

In FIG. 14 which is a side view seen from the top end side and showing a further embodiment of the water-cooled horn antenna, FIG. 15 which is a sectional view taken along the line 15—15 of FIG. 14, FIG. 16 which is a sectional view taken along the line 16—16 of FIG. 14, FIG. 17 which is a sectional view taken along the line 17—17 of FIG. 15 and showing a top end side and FIG. 18 which is a sectional view taken along the line 18—18 of FIG. 15 and showing a base end side, the reference numerals 91 and 92 designate inner pipes made of copper. The two inner pipes 91 and 92 are arranged in parallel to each other. The inner pipes 91 and 92 have enlarged-diameter portions 91a and 92a at top end portions thereof at the left side in the drawing, and flages 91b and 92b at base end portions thereof, respectively.

The whole inside of each of the inner pipes 91 and 92 serves as a wave guide, and each of the enlarged-diameter portions 91a and 92a provided at the top end portions of the inner pipes serves as a horn antenna for performing propagation of a microwave signal from the radar, radiation of the microwave signal from the antenna, reception of the microwave signal and propagation of the signal to the radar.

The inner diameter of each of the inner pipes 91 and 92 is determined by the wavelength of the microwave signal used. The inner diameter 'a' for the wavelength is established to be in a range of $0.58\lambda$ to $0.76\lambda$.

The performance of the horn antenna is determined by the shape of the inner surface of the enlarged-diameter portion. Both the gain of the horn antenna and the directivity of the antenna as to signal radiation can be improved by increasing both the diameter at the top end of the enlarged-diameter portion and the total length of the enlarged-diameter portion. In this embodiment, the gain of about 20 dB is obtained when the inner diameter of the top end portion and the total length of the enlarged-diameter portion are $3.7\lambda$ and $10.7\lambda$, respectively.

The reference numeral 93 designates a partitioning pipe made of steel to surround the inner pipes 91 and 92. An aperture 93a semi spherically shaped is provided at the top end portion at the left side in the drawing. The enlarged-diameter portions 91a and 92a of the inner pipes 91 and 92 pierces the top end portion of the partitioning pipe 93.

The reference numeral 94 designates an outer pipe made of steel to surround the inner pipes 91 and 92 and the partitioning pipe 93. The top end of the outer round pipe 84 and the top ends of the enlarged-diameter portions 91a and 92a of the inner round pipes are joined to each other by welding, so that a gap formed between the top ends thereof is closed. Entirely between the outerpipe 94 and the inner pipes 91 and 92, two cooling water paths 95a and 95b communicated with each other at the aperture 93a at the top end of the partitioning pipe are formed by the partitioning pipe 93.

The reference numeral 96 designates a water inlet provided at a base end side of the outer cooling water path 95a. The reference numeral 97 designates a water outlet provided at a base end side of the inner cooling water path 95b. The reference numerals 98 and 99 designate gas purgers provided at the base end sides of the inner pipes 91 and 92. The diameter of each of the gas purgers is designed to be not larger than one-fourth the wavelength of the microwave signal used.

In the water-cooled antenna in this embodiment, when cooling water is introduced into the water inlet 96 provided at the base end portion of the outer pipe-side cooling water path 95a as one of the two cooling water paths 95a and 95b formed by the partitioning pipe 93 between the inner pipes 91 and 92 and the outer pipe 94, the cooling water is passed through the cooling water path 95a and reaches the top end portion thereof. Then, the cooling water is passed through the aperture 93a at the top end of the partitioning pipe toward the inner pipe-side cooling water path 95nb and then exhausted out at the water outlet 97 through the cooling water path 95b. Accordingly, the heat received by the inner pipes 91 and 92, the enlarged-diameter portions 91a and 92a and the outer pipe 94 in the furnace is removed by cooling water flowing in the cooling water paths, when the water-cooled antenna is inserted in the furance.

The water-cooled antenna in this embodiment has a sufficient cooling effect even when the atmospheric temperature in the furnace is 1500° C. Accordingly, for measurement, the antenna can be deeply inserted in the furnace.

When a purge gas such as a nitrogen gas, air, an argon gas, etc. is fluxed in the gas purgers 98 and 99 provided at the base end sides of the inner pipes 91 and 92, the gas enters into the inner pipes 91 and 92 and is put out at the top end of the inner pipes 91 and 92, so that the inner surfaces of the enlarged-diameter portions 91a and 92a at the top ends of the inner pipes serving as a horn antenna are purged to make maintenance of the antenna easy without spoiling the cooling effect due to the cooling water.

In this embodiment, the water inlet 96 is provided at the base end side of the outer pipe-side cooling water path 95a to introduce cooling water. This is because the outer surface of the outer pipe 94 being in contact with hot air in the furnace can be cooled efficiently, compared with the inner pipes 91 and 92 being prevented from contact with hot air in the furnace by the gas purge.

Figure 19:
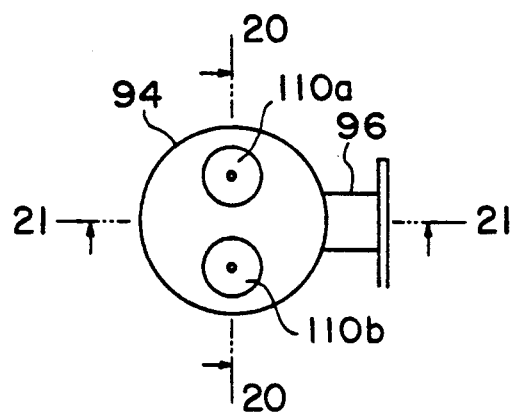
FIG. 19 is a side view of a water-cooled horn antenna as a further embodiment of the invention and taken from a front end side thereof.
Figure 22:
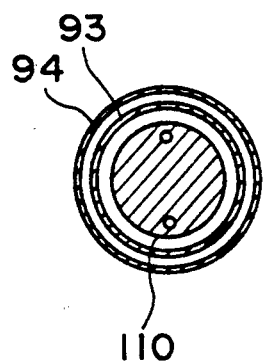
FIG. 22 is a sectional view taken along the line 22—22 of FIG. 20 and showing a front end side of the antenna.
Figure 23:
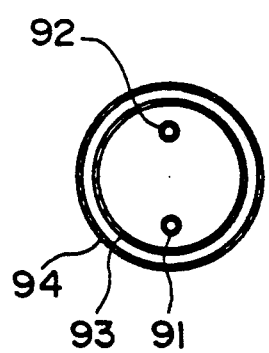
FIG. 23 is a sectional view taken along the line 23—23 of FIG. 20 and showing a base end side of the antenna.
Figure 20:
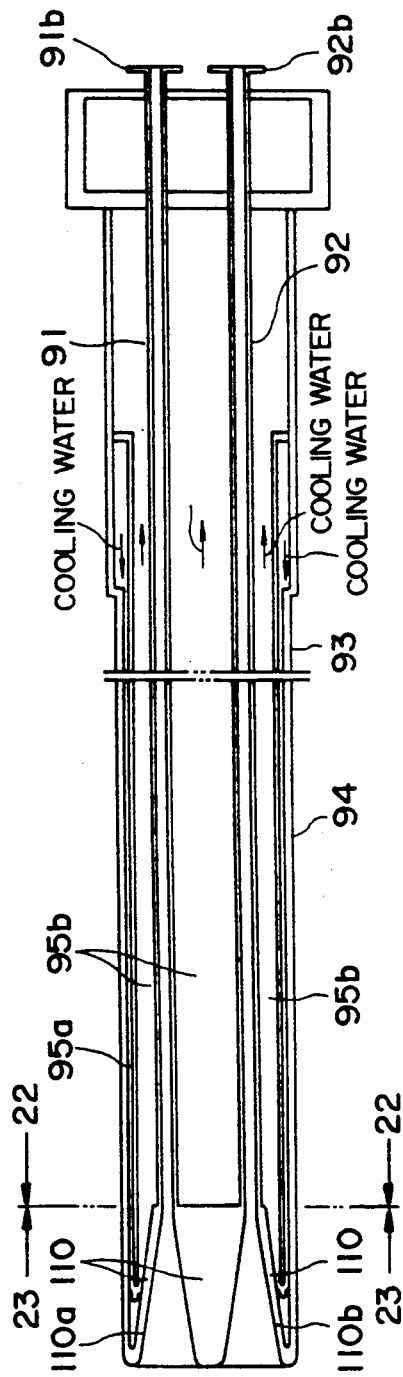
FIG. 20 is a sectional view taken along the line 20—20 of FIG. 19.
Figure 21:
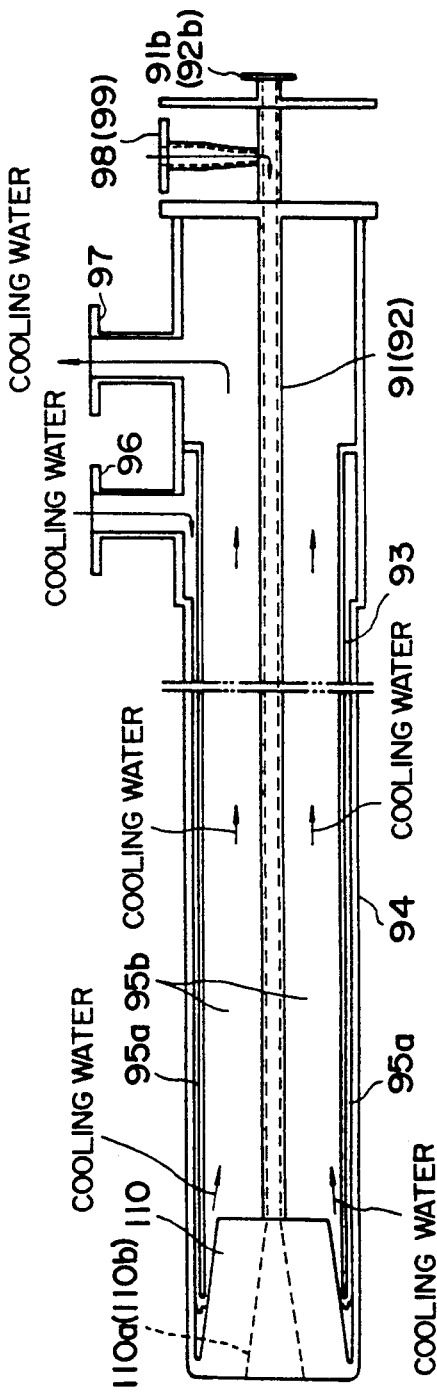
FIG. 21 is a sectional view taken along the line 21—21 of FIG. 19.

In FIG. 19 which is a side view seen from the top end side and showing a further embodiment of the water-cooled horn antenna, FIG. 20 which is a sectional view taken along the line 20—20 of FIG. 19, FIG. 21 which is a sectional view taken along the line 21—21 of FIG. 19, FIG. 22 which is a sectional view taken along the line 22—22 of FIG. 20 and showing a top end side and FIG. 23 which is a sectional view taken along the line 23—23 of FIG. 20 and showing a base and side, like numerals refer to like parts as in the aforementioned embodiments and the description thereof is omitted.

In these drawings, the reference numeral 110 designates a unified enlarged-diameter portion formed by unifying the enlarged-diameter portions 91a and 92a as shown in FIG. 14 into one molding. The inner pipes 91 and 92 are connected to the unified enlarged-diameter portion, so that the inner surfaces 110a and 110b of the enlarged-diameter portion 110 serve as horn antennas, respectively. The top end portion of the partitioning pipe 93 is shaped like a long pipe, so that cooling water paths communicated with each other at the top end portion are formed between the inner pipes 91 and 92 are the outer pipe 94.

In this embodiment, both the simplification in manufacturing process and the reduction in manufacturing cost can be made by changing both the shape of the enlarged-diameter portion and the shape of the partitioning pipe, compared with the embodiment shown in FIG. 20. Both the operation and effect of the water-cooled antenna in this embodiment are similar to those in the previous embodiment.

Although the aforementioned embodiments shown the case where the inner pipes 91 and 92 are made of copper to be used as a waveguide, it is a matter of course that the inner pipes except the inner surfaces thereof made of copper may be made of steel.

Although the embodiments shown the case where the shape of each of the inner partitioning and outer pipes is round in section, it is a matter of course that the invention can be applied to the case where the shape of each of the inner, partitioning and outerpipes is quadrilateral or polygonal.

Figure 24:
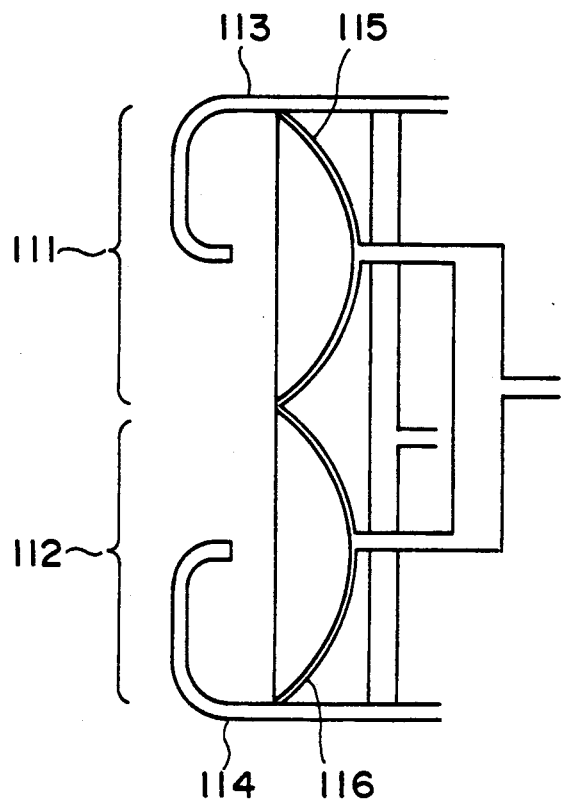
FIG. 24 is a side view of a water-cooled parabola antenna as an embodiment of the invention.
Figure 25:
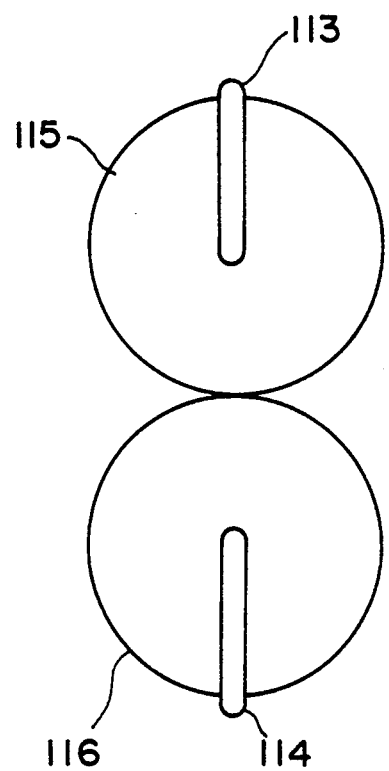
FIG. 25 is a front view of the antenna of the embodiment of FIG. 24.
Figure 26:
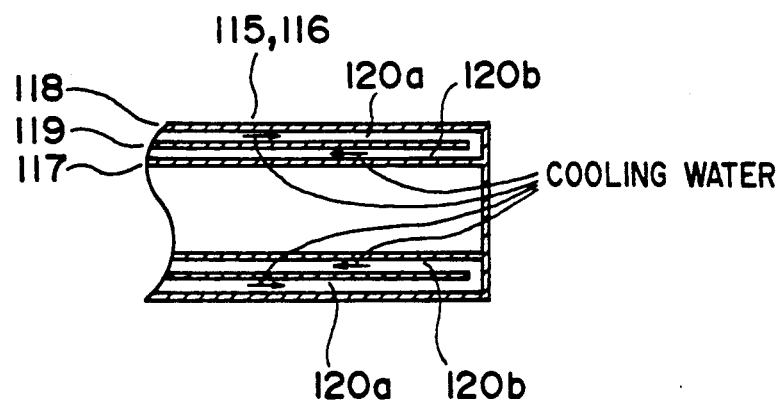
FIG. 26 is a sectional view showing an example of the configuration of the primary radiator.

In FIG. 24 which is a side view showing a water-cooled parabola antenna as an embodiment of the invention, FIG. 25 which is a front view showing the embodiment, FIG. 26 which is a sectional view, showing the structure of a primary radiator, FIG. 27 which is a sectional view showing the structure of a reflector and FIG. 28 which is a structural view showing a spacer, the reference numerals 111 and 112 designate transmission and reception parabola antennas respectively, and 113 and 114 designate water-cooled waveguide and feeders serving as primary radiators for parabola antennas respectively. The reference numerals 115 and 116 designate parabola antenna water-cooled reflectors having parabola-curved surfaces opposite to aperture surfaces of the primary radiators respectively.

In this embodiment, the primary radiators 113 and 114 of the water-cooled parabola antenna are composed of an inner pipe 117 serving as a waveguide and feeder as shown in FIG. 32, and outer pipe 118 made of steel and joined to the inner pipe at the top end portion thereof by welding so as to enclose the inner pipe therein, a partitioning pipe 119 made of steel and disposed between the inner pipe 117 and the outer pipe 118. The primary radiators 113 and 114 have a treble pipe structure in which cooling water paths 120a and 120b communicated with each other at the top end portion thereof are formed. In the primary radiators in this embodiment, the heat which the primary radiators receive in the furnace is removed by passing water through the cooling water paths 120a and 120b, so that the primary radiators are cooled.

As shown in FIG. 27, the reflector of the water-cooled parabola antenna in this embodiment is composed of a reflection plate 121 for forming a parabola-curved surface opposite to the aperture of the primary radiator, a backplate 122 joined to the reflection plate at the outer circumferential portion thereof and disposed at the back surface of the reflection plate 121, a partitioning plate 123 disposed between the reflection plate 121 and the backplate 122, and a spiral spacer 124 disposed between the reflection plate 121 and the partitioning plate 123. Between the reflection plate 121 and the backplate 122, a spiral cooling water path 125a and a cooling water path 125b are formed by the partitioning plate 123 and the spacer 124. The reference numeral 126 designates a water supply pipe connected to the center of the partitioning plate 123 and continued to the water cooling path 125a. The reference numeral 127 designates a water exhaust pipe connected to the backplate 122 and continued to the back cooling water path 125b.

In the reflectors 115 and 116 in this embodiment, when cooling water is introduced in the water supply pipe 126, the cooling water is passed through the cooling water paths 123a from the center portion to the outer portion. Then, the cooling water turns over at the outer circumferential portion and is passed through the cooling water path 125b. Finally, the cooling water is exhausted through the exhaust pipe 127. Accordingly, the heat which the reflection plate 121 receives in the furnace is removed by the cooling water flowing the cooling water paths, so that the reflectors 115 and 116 are cooled. By forming the cooling water path 125a spiraly, the heat removal from the reflection plate 121 by cooling water can be made uniformly, so that the reflection plate 121 can be cooled. Accordingly, the lowering of the performance the antenna caused by the distortion and deformation of the parabola-curved surface caused by the unevenness of temperature distribution in the reflection plate 121 can be prevented.

In the water-cooled parabola antenna in this embodiment, sufficient cooling characteristics can be attained even when the atmospheric temperature in the furnace takes a high value of about 1500° C. Accordingly, the water-cooled parabola antenna can be put in a convertor or the like.

In FIG. 29 which is a side view showing the water-cooled parabola antenna as another embodiment and FIG. 30 which is a front view showing the embodiment, like numerals refer to like parts and the description thereof is omitted. In these drawings, the reference numerals 130 and 131 designate supporting members for respectively supporting the primary radiators of the transmission and reception parabola antennas.

In the water-cooled parabola antenna in this embodiment, not only the mechanical strength of the primary radiators 113 and 114 can be increased but also the deformation of the primary radiators 113 and 114 caused by the unevenness of heat received by the primary radiators 113 and 114 in the furnace can be prevented by supporting the primary radiators 113 and 114 of the transmission and reception antennas by the supporting members 130 and 131. Accordingly, the lowering of the performance of the antenna caused by the shifting of the relative position of the primary radiator and the reflector can be prevented. In this embodiment, heat-resisting ceramics are used as the supporting members 130 and 131.

Although treble-pipe-structure waveguides and feeders are used as the primary radiators in the water-cooled parabola antenna in this embodiment, double-pipe structure waveguides and feeders may be used to dispose a partitioning plate between the inner and outer pipes to form cooling water paths.

In this embodiment, the insides of the waveguide of the primary radiators, the inner surfaces of the feeders and the parabola curved surfaces of the reflectors can be purged by a purge gas such as a nitrogen gas, air, an argon gas, or the like to make maintenance of the antenna easy without spoiling the cooling effect due to the cooling water.

What is claimed is:

1. An in-furnace level meter comprising:
    a microwave radar having transmission and reception antenna to be inserted in a furnace, for supplying a microwave signal to said transmission antenna, for calculating a distanc between the antenna and a slag surface in said furnace on the basis of said microwave signal reflected from said slag surface and received by said reception antenna, and for outputting the result of said calculation as an output signal of a level measurement value;
    an antenna moving means for moving said transmission and reception antennas inserted in said furnace in an upward or downward direction in response to an antenna up/down control signal;
    an antenna position measuring means for measuring an antenna position to thereby provide an antenna position signal; and
    a signal processing section for calculating an in-furnace slag level position on the basis of said level measurement value signal of said microwave radar and said antenna position signal of said antenna position measuring means, and for calculating an antenna movement distance by comparing said in-furnace slag level position with a set point or upper-limit and lower-limit set points to supply said antenna movement distance as said antenna up/down control signal to said antenna moving means.

2. An in-furnace level meter according to claim 1, in which said microwave radar includes:
    a first pseudo random signal generation means for outputting a first pseudo random signal;
    a second pseudo random signal generation means for outputting a second pseudo random signal having a pattern the same as that of said first pseudo random signal and having a frequency slightly different from that of said first pseudo random signal;
    a first multiplier for multiplying said first and second pseudo random signals by each other;
    a carrier generation means providing an output signal;
    a transmission means for transmitting a transmission signal to a target, said transmission signal being formed by modulating an output signal of said carrier generation means on the basis of said first pseudo random signal;
    a reception means for receiving a signal reflected from said target to thereby obtain a reception signal;
    a second multiplier for multiplying said reception signal by said second pseudo random signal to thereby output a carrier;
    a detector means for detecting said carrier outputted from said second multiplier to thereby output a detection signal; and
    a time difference measurement means for measuring a time difference between a time series pattern of said detection signal outputted from said detector means and a time series pattern of a multiplication value outputted from said first multiplier.

3. An in-furnace level meter according to claim 2, in which said detector means includes;
    a first distributor coupled to the output of said carrier generation means;
    a hybrid coupler supplied with an output of said first distributor and for converting said output into an in-phase component, namely, an I signal and a quadrature component, namely, a Q signal, said I and Q signals having phases perpendicularly intersecting each other;
    a second distributor for distributing the output of said second, multiplier into two signals, namely, an R1 Signal, and and R2 signal;
    a third multiplier for multiplying said I signal outputted from said hybrid coupler by said R1 signal outputted from said second distributor; and
    a fourth multiplier for multiplying said Q signal outputted from said hybrid coupler by said R2 signal outputted from said second distributor.

4. An in-furnace level meter according to claim 2, in which said time difference measurement means includes:
    a first low-pass filter supplied with the output of said first multiplier to thereby perform a band limitation,
    second and third low-pass filters supplied with the output signals of said third and fourth multipliers respectively to thereby perform band limitations independently of each other;
    first and second squaring circuits supplied with the output signals of said second and third low-pass filters respectively to thereby perform squaring operations independently of each other;
    an adder for adding the respective output signals of said first and second squaring circuits to each other; and
    a time measurer for measuring a time between a point of time when the output signal of said first low-pass filter reaches its maximum value and a point of time when the output signal of said adder reaches its maximum value.

5. A water-cooled horn antenna for use in an in-furnace level meter, said antenna comprising:
- an inner metal pipe having an inside portion serving as a waveguide and an enlarged-diameter portion disposed at a front end thereof for serving as a horn antenna;
- an outer metal pipe surrounding said inner pipe;
- two cooling water paths formed by joining a front end of said inner pipe to a front end of said outer pipe while disposing a partitioning member substantially entirely between said inner pipe and said outer pipe, said two cooling water paths being communicated with each other at a front end side of the two pipes; and
- a cooling water inlet and a cooling water outlet respectively provided at base end sides of said cooling water paths.

6. A water-cooled horn antenna according to claim 5, further comprising a gas purger provided at the base end sides of said inner pipe for serving to flux a purge gas in.

7. A water-cooled horn antenna for use in an in-furnace level meter, said antenna comprising;
- first and second inner metal pipes each of which has an inside portion serving as a waveguide and an enlarged diameter portion disposed at a front end thereof for serving as a horn antenna;
- an outer metal pipe surrounding said first and second inner pipes;
- two cooling water paths formed by joining said enlarged diameter portion of said first and second inner pipes at their front ends with a front end portion of said outer pipe while disposing a partitioning member substantially entirely between said inner pipes and said outer pipe, said two cooling water paths being communicated with each other at front end sides of said pipes; and
- a cooling water inlet and a cooling water outlet respectively provided at base end sides of the cooling water paths.

8. A water-cooled horn antenna according to claim 7, further comprising a gas purger provided at the base end side of said first and second inner pipes and serving to flux a purge gas in.

9. A water-cooled parabola antenna for an in-furnace level meter, said antenna comprising a primary radiator having a water-cooled structure and a reflector having a water-cooled structure and having a parabola curved surface opposite to an aperture surface of said primary radiator, and in which said primary radiator is constituted by a set of waveguide and feeder having a water-cooled structure composed of a double or a treble pipe structure.

10. A water-cooled parabola antenna for an in-furnace level meter, said antenna comprising a primary radiator having a water-cooled structure and a reflector having a water-cooled structure and having a parabola curved surface opposite to an aperture surface of said primary radiator, and in which said reflector has a reflection plate having said parabola curved surface, a backplate disposed at a back surface of said reflection plate, a partitioning member disposed between said reflection plate and said backplate, a cooling water path formed by joining said reflection plate to said backplate at an outer circumferential portion thereof, a cooling water inlet, and a cooling water outlet.

11. A water-cooled parabola antenna according to claim 9, in which said waveguide of said primary radiator and the inner surface of said horn antenna are purged from said parabola curved surface of said reflector by a gas.

* * * * *